United States Patent
Yang et al.

(10) Patent No.: US 12,549,229 B2
(45) Date of Patent: Feb. 10, 2026

(54) 60 GHZ OPERATING MODE FOR WIRELESS LOCAL AREA NETWORKS (WLANS)

(71) Applicant: QUALCOMM Incorporated, San Diego, CA (US)

(72) Inventors: Lin Yang, San Diego, CA (US); Bin Tian, San Diego, CA (US); Alfred Asterjadhi, San Diego, CA (US); Youhan Kim, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/811,529

(22) Filed: Aug. 21, 2024

(65) Prior Publication Data

US 2024/0413866 A1    Dec. 12, 2024

Related U.S. Application Data

(63) Continuation of application No. 17/738,892, filed on May 6, 2022, now Pat. No. 12,101,148.

(51) Int. Cl.
*H04B 7/06* (2006.01)
*H04W 84/12* (2009.01)

(52) U.S. Cl.
CPC ......... *H04B 7/0617* (2013.01); *H04B 7/0619* (2013.01); *H04W 84/12* (2013.01)

(58) Field of Classification Search
CPC ............................ H04B 7/0617; H04B 7/0619; H04B 7/06952; H04W 84/12; H04W 48/16

See application file for complete search history.

(56) References Cited

U.S. PATENT DOCUMENTS

2014/0286203 A1*  9/2014  Jindal ............... H04W 16/14
                                                       370/278
2016/0295535 A1* 10/2016  Jose ................ H04W 56/003
(Continued)

FOREIGN PATENT DOCUMENTS

WO        2020048417 A1    3/2020

OTHER PUBLICATIONS

International Search Report and Written Opinion—PCT/US2023/019372—ISA/EPO—Jul. 19, 2023 (2203503WO).

*Primary Examiner* — Sung S Ahn
(74) *Attorney, Agent, or Firm* — Kevin M. Donnelly; Holland & Hart LLP

(57) ABSTRACT

This disclosure provides methods, devices and systems for increasing carrier frequencies for wireless communications in wireless local area networks (WLANs). Some implementations more specifically relate to BSS discovery and association techniques that support wireless communications on carrier frequencies above 7 GHz. In some aspects, an access point (AP) may communicate using beamforming on a wireless communication link operating at a carrier frequency above 7 GHz (the "directional link") while offloading the BSS discovery and association procedures needed to support such communications onto a wireless communication link operating at a carrier frequency below 7 GHz (the "anchor link"). In some implementations, the AP may perform a beamforming training operation with a STA over the directional link upon associating with the STA over the anchor link. In such implementations, the AP may communicate with the STA over the directional link using a beam derived from the beamforming training operation.

30 Claims, 20 Drawing Sheets

(56) References Cited

U.S. PATENT DOCUMENTS

| | | |
|---|---|---|
| 2018/0199324 A1 | 7/2018 | Sun et al. |
| 2019/0090253 A1* | 3/2019 | Da Silva ............. H04W 72/542 |
| 2019/0174571 A1* | 6/2019 | Deenoo ................ H04W 76/27 |
| 2023/0361822 A1 | 11/2023 | Yang et al. |

* cited by examiner

60 GHZ OPERATING MODE FOR WIRELESS LOCAL AREA NETWORKS (WLANS)

CROSS REFERENCE

The present Application for Patent is a continuation of U.S. patent application Ser. No. 17/738,892 by YANG et al., entitled "60 GHZ OPERATING MODE FOR WIRELESS LOCAL AREA NETWORKS (WLANS)," filed May 6, 2022, assigned to the assignee hereof, and expressly incorporated by reference in its entirety herein.

TECHNICAL FIELD

This disclosure relates generally to wireless communication, and more specifically, to a 60 GHz operating mode for wireless local area networks (WLANs).

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Many existing WLAN communication protocols are designed for wireless communications on carrier frequencies below 7 GHz (such as in the 2.4 GHz, 5 GHz, or 6 GHz frequency bands). However, new WLAN communication protocols are being developed to enable enhanced WLAN communication features (such as higher throughput and wider bandwidth) that require even higher carrier frequencies (such as in the 45 GHz or 60 GHz frequency bands). Wireless communications on higher carrier frequencies may suffer from greater phase noise and greater path loss compared to wireless communications on lower carrier frequencies. Thus, as new WLAN communication protocols enable enhanced features, new packet designs and modes of operation are needed to support wireless communications on carrier frequencies above 7 GHz.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless access point (AP), and may include transmitting, on a first wireless communication link, one or more management frames advertising a basic service set (BSS) associated with the AP; associating with a wireless station (STA) over the first wireless communication link based on the one or more management frames; performing a beamforming training operation with the STA over a second wireless communication link based on associating with the STA over the first wireless communication link; and communicating with the STA over the second wireless communication link using a beam based on the beamforming training operation. In some implementations, the first wireless communication link may operate at a carrier frequency below 7 GHz and the second wireless communication link may operate at a carrier frequency above 7 GHz.

In some aspects, the method may further include exchanging beam management setup information with the STA over the first wireless communication link, where the beam management setup information signals the start of the beamforming training operation. In some implementations, the beam management setup information may include frequency information indicating a carrier frequency offset (CFO) associated with wireless communications on the second wireless communication link. In some implementations, the beam management setup information may include timing information indicating a timing of wireless communications on the second wireless communication link. In some implementations, the method may further include transmitting, on the first wireless communication link, scheduling information allocating a service period (SP) for the communications with the STA over the second wireless communication link.

In some aspects, the performing of the beamforming training operation may include transmitting a plurality of physical layer (PHY) convergence protocol (PLCP) protocol data unit (PPDUs) in a plurality of directions, respectively, on the second wireless communication link, where each PPDU of the plurality of PPDUs consists of a single PHY training field; and receiving feedback from the STA responsive to transmitting the plurality of PPDUs, where the feedback indicates a direction for tuning a plurality of antennas. In some implementations, the AP may communicate with the STA over the second wireless communication link via the plurality of antennas tuned in the direction indicated by the feedback. In some implementations, the feedback may be carried in a PPDU consisting of a single PHY training field. In some other implementations, the feedback may be carried in a PPDU consisting of a single PHY training field and a single PHY signal field. In some implementations, the feedback may be received on the second wireless communication link. In some other implementations, the feedback may be received on the first wireless communication link.

Another innovative aspect of the subject matter described in this disclosure can be implemented in an AP. In some implementations, the AP may include at least one memory and at least one processor communicatively coupled with the at least one memory and configured to cause the AP to perform operations including transmitting, on a first wireless communication link, one or more management frames advertising a BSS associated with the AP; associating with a STA over the first wireless communication link based on the one or more management frames; performing a beamforming training operation with the STA over a second wireless communication link based on associating with the STA over the first wireless communication link; and communicating with the STA over the second wireless communication link using a beam based on the beamforming training operation. In some implementations, the AP may further include a local oscillator (LO) configured to drive the carrier frequencies associated with each of the first wireless communication link and the second wireless communication link. In some implementations, the AP may further include a clock configured to control a timing of communications on each of the first wireless communication link and the second wireless communication link.

Another innovative aspect of the subject matter described in this disclosure can be implemented as a method of wireless communication. The method may be performed by a STA and may include receiving, on a first wireless communication link, one or more management frames advertising a BSS associated with an AP; associating with the AP over the first wireless communication link based on the one or more management frames; performing a beamforming training operation with the AP over a second wireless communication link based on associating with the AP over the first wireless communication link; and communicating with the AP over the second wireless communication link using a beam based on the beamforming training operation. In some implementations, the first wireless communication link may operate at a carrier frequency below 7 GHz and the second wireless communication link may operate at a carrier frequency above 7 GHz.

In some aspects, the method may further include exchanging beam management setup information with the AP over the first wireless communication link, the beam management setup information signaling the start of the beamforming training operation. In some implementations, the beam management setup information may include frequency information indicating a CFO associated with wireless communications on the second wireless communication link. In some implementations, the beam management setup information may include timing information indicating a timing of wireless communications on the second wireless communication link. In some implementations, the method may further include receiving, on the first wireless communication link, scheduling information allocating an SP for the communications with the AP over the second wireless communication link.

In some aspects, the performing of the beamforming training operation may include transmitting a plurality of PPDUs in a plurality of directions, respectively, on the second wireless communication link, where each PPDU of the plurality of PPDUs consists of a single PHY training field; and receiving feedback from the AP responsive to transmitting the plurality of PPDUs, where the feedback indicates a direction for tuning a plurality of antennas. In some implementations, the STA may communicate with the AP over the second wireless communication link via the plurality of antennas tuned in the direction indicated by the feedback. In some implementations, the feedback may be carried in a PPDU consisting of a single PHY training field. In some other implementations, the feedback may be carried in a PPDU consisting of a single PHY training field and a single PHY signal field. In some implementations, the feedback may be received on the second wireless communication link. In some other implementations, the feedback may be received on the first wireless communication link.

Another innovative aspect of the subject matter described in this disclosure can be implemented in a STA. In some implementations, the STA may include at least one memory and at least one processor communicatively coupled with the at least one memory and configured to cause the STA to perform operations including receiving, on a first wireless communication link, one or more management frames advertising a BSS associated with an AP; associating with the AP over the first wireless communication link based on the one or more management frames; performing a beamforming training operation with the AP over a second wireless communication link based on associating with the AP over the first wireless communication link; and communicating with the AP over the second wireless communication link using a beam based on the beamforming training operation. In some implementations, the STA may further include an LO configured to drive the carrier frequencies associated with each of the first wireless communication link and the second wireless communication link. In some implementations, the STA may further include a clock configured to control a timing of communications on each of the first wireless communication link and the second wireless communication link.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
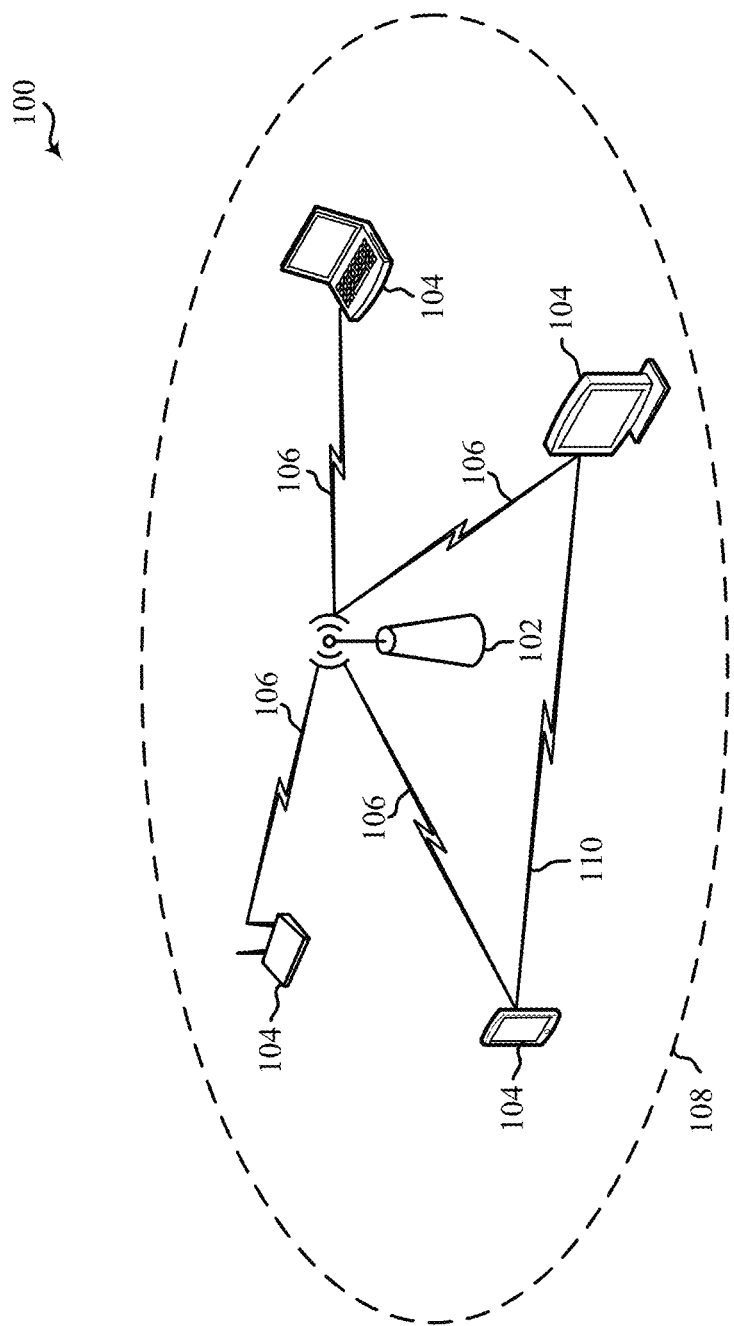
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

As described above, new WLAN communication protocols are being developed to enable enhanced features for wireless communications on carrier frequencies above 7 GHz (such as in the 60 GHz or 45 GHz frequency bands). However, wireless communications on higher carrier frequencies may suffer from greater phase noise and path loss compared to wireless communications on lower frequency bands. Aspects of the present disclosure recognize that analog beamforming (using a large number of antenna elements) can mitigate the effects of path loss and achieve greater wireless communication range on carrier frequencies above 7 GHz. Analog beamforming is a wireless communication technique by which a transmitting device and a receiving device can adjust the gains and phases of their transmit (TX) and receive (RX) antenna elements to achieve directionality in wireless communications. For example, the transmitting device may tune a set of TX antennas to focus the energy of transmitted signals in a particular direction (referred to as "TX beamforming"). Similarly, the receiving device may tune a set of RX antennas to focus the energy of received signals in a particular direction (referred to as "RX beamforming"). Optimal beamforming gains can be achieved (such as may be needed to overcome path loss in the 60 GHz frequency band) when TX beamforming is used in combination with RX beamforming. The process by which the transmitting device and the receiving device tune their antennas for beamforming is referred to as a "beamforming training" operation.

Existing versions of the IEEE 802.11 standard define a basic service set (BSS) discovery protocol for carrier frequencies below 7 GHz (also referred to as a "sub-7 GHz" frequency band), whereby a wireless access point (AP) advertises its BSS in management frames (such as beacons or probe responses) transmitted omnidirectionally. Any wireless stations (STAs) within a coverage area of the AP may receive such management frames and request to associate with the BSS. As described above, omnidirectional communications suffer significant path loss at carrier frequencies above 7 GHz. Although beamforming can help offset the path loss associated with wireless communications on carrier frequencies above 7 GHz, the directionality of beamformed signals (or "beams") presents a challenge for BSS discovery and association. For example, beamforming gains can be realized only when the AP transmits a beam in the direction of a particular STA (or a direction associated with a desired link budget). However, the direction of a STA is generally not known to the AP prior to discovery. Accordingly, new modes of BSS discovery (and association) are needed to support wireless communications on carrier frequencies above 7 GHz.

Various aspects relate generally to increasing carrier frequencies for wireless communications in WLANs, and more particularly, to BSS discovery and association techniques that support wireless communications on carrier frequencies above 7 GHz. In some aspects, an AP may utilize multiple wireless communication links to facilitate various management and control functions for directional communications. More specifically, the AP may communicate using beamforming on a wireless communication link operating at a carrier frequency above 7 GHz (also referred to as a "directional link") while offloading the BSS discovery and association procedures needed to support such communications onto a wireless communication link operating at a carrier frequency below 7 GHz (also referred to as an "anchor link"). In some implementations, the AP may perform a beamforming training operation with a STA over the directional link upon associating with the STA over the anchor link. In such implementations, the AP may communicate with the STA over the directional link using a beam derived from the beamforming training operation. In some aspects, the AP may further transmit a trigger frame on the anchor link signaling the start of the beamforming training operation and various control parameters associated therewith. In some implementations, the trigger frame may synchronize wireless communications on the anchor link with wireless communications on the directional link. For example, the trigger frame may provide a timing or frequency reference for the wireless communications on the directional link.

Particular implementations of the subject matter described in this disclosure can be implemented to realize one or more of the following potential advantages. By utilizing a directional link (operating at a carrier frequency above 7 GHz) for data communications and an anchor link (operating at a carrier frequency below 7 GHz) for management and control functions associated with the directional link, aspects of the present disclosure can leverage existing WLAN communication protocols and hardware to support wireless communications on carrier frequencies above 7 GHz. As described above, existing BSS discovery and association operations can be performed using omnidirectional communications on carrier frequencies below 7 GHz.

However, directional communications may benefit from enhanced features (such as wider bandwidths or higher data rates) on carrier frequencies above 7 GHz. By offloading, onto an anchor link, the BSS discovery and association operations needed to support wireless communications on a directional link, an AP can achieve the benefits of directional communication at higher carrier frequencies and omnidirectional communication for BSS discovery and association. By synchronizing wireless communications on the anchor link with wireless communications on the directional link, an AP can further reduce the overhead and delays associated with communicating on the directional link.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MH2, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
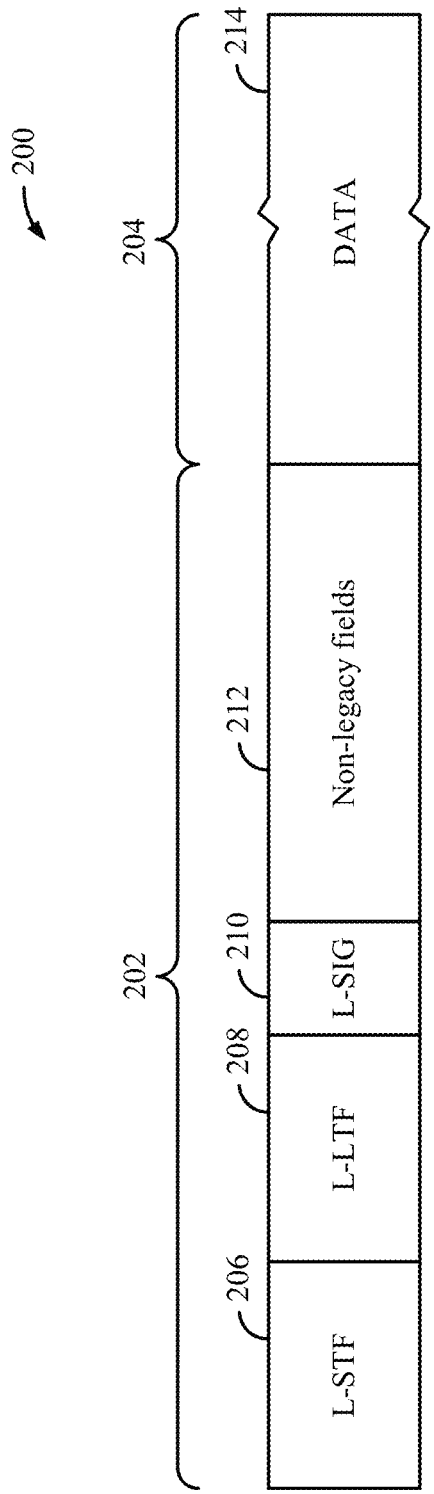
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
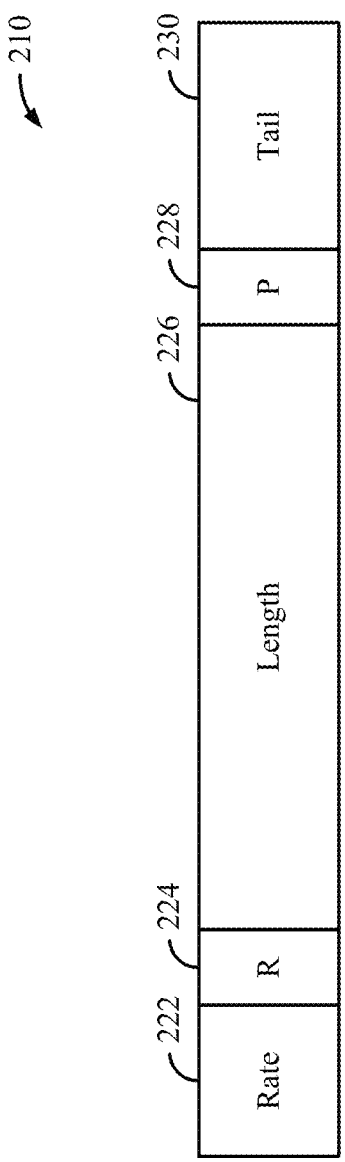
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3:
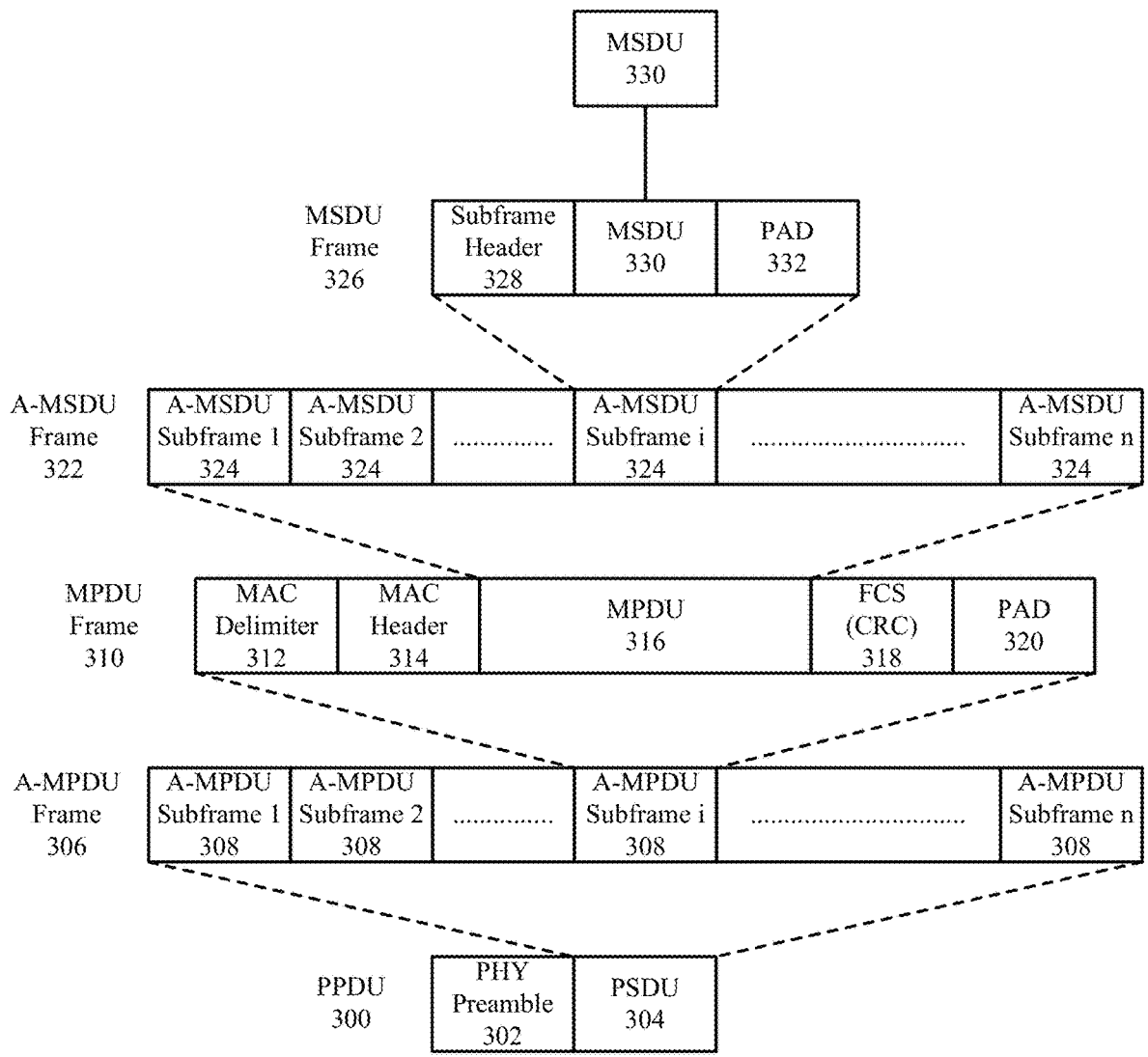
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 326. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
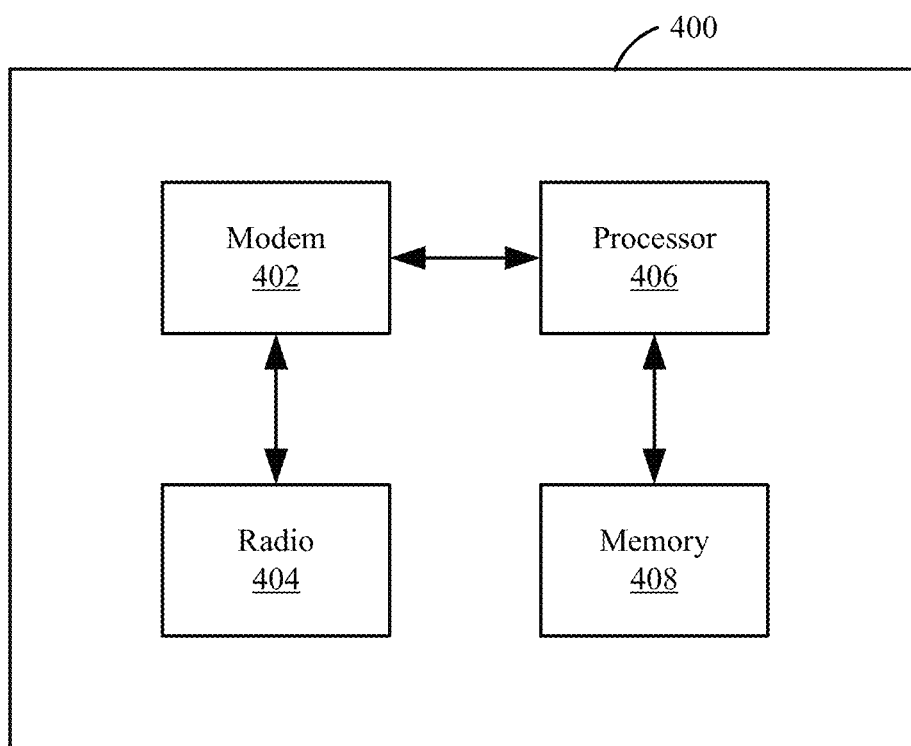
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques.

In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
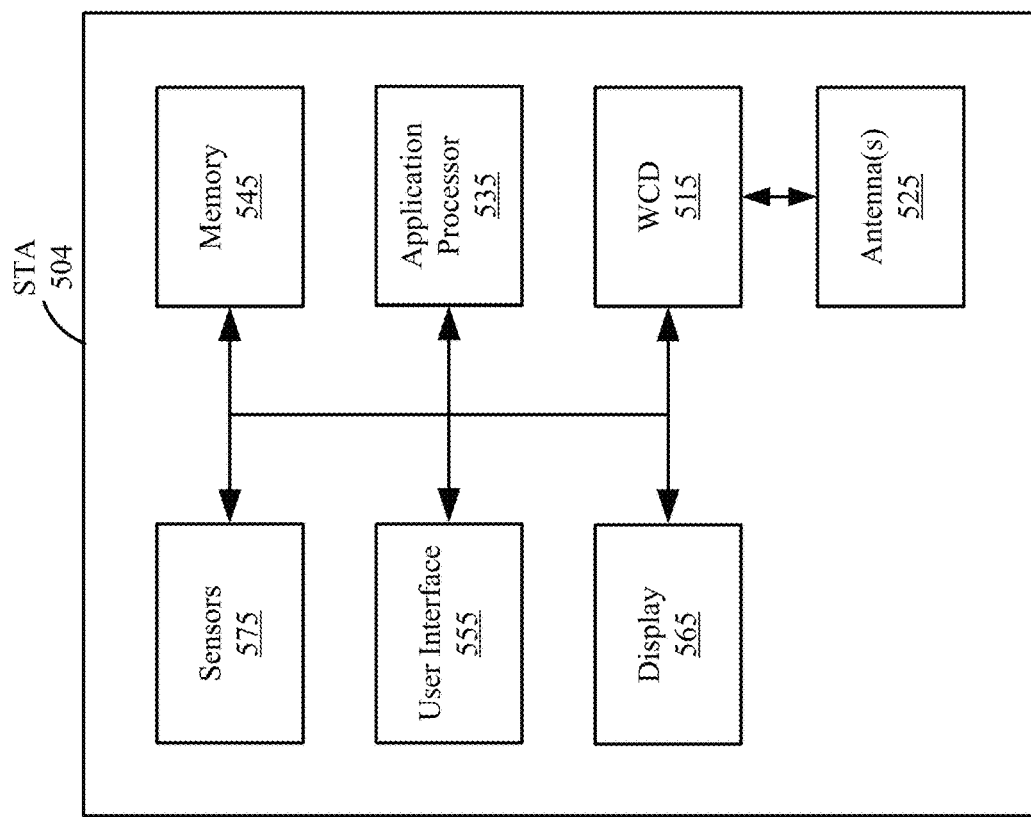
FIG. 5B shows a block diagram of an example STA.
Figure 5A:
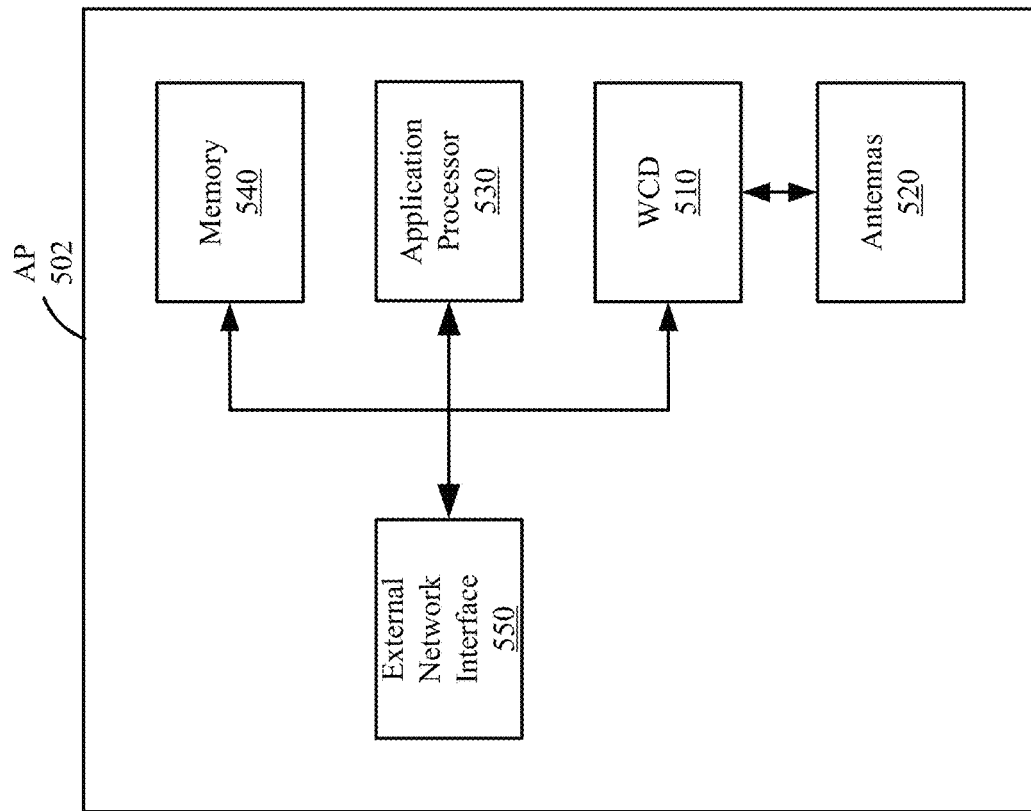
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, new WLAN communication protocols are being developed to enable enhanced features for wireless communications on carrier frequencies above 7 GHz (such as in the 60 GHz or 45 GHz frequency bands). However, wireless communications on higher carrier frequencies may suffer from greater phase noise and path loss compared to wireless communications on lower frequency bands. Aspects of the present disclosure recognize that analog beamforming (using a large number of antenna elements) can mitigate the effects of path loss and achieve greater wireless communication range on carrier frequencies above 7 GHz. Analog beamforming is a wireless communication technique by which a transmitting device and a receiving device can adjust the gains and phases of their transmit (TX) and receive (RX) antenna elements to achieve directionality in wireless communications. For example, the transmitting device may tune a set of TX antennas to focus the energy of transmitted signals in a particular direction (referred to as "TX beamforming"). Similarly, the receiving device may tune a set of RX antennas to focus the energy of received signals in a particular direction (referred to as "RX beamforming"). Optimal beamforming gains can be achieved (such as may be needed to overcome path loss in the 60 GHz frequency band) when TX beamforming is used in combination with RX beamforming. The process by which the transmitting device and the receiving device tune their antennas for beamforming is referred to as a "beamforming training" operation.

Existing versions of the IEEE 802.11 standard define a BSS discovery protocol for carrier frequencies below 7 GHz (also referred to as a "sub-7 GHz" frequency band), whereby an AP advertises its BSS in management frames (such as beacons or probe responses) transmitted omnidirectionally. Any STAs within a coverage area of the AP may receive such management frames and request to associate with the BSS. As described above, omnidirectional communications suffer significant path loss at carrier frequencies above 7 GHz. Although beamforming can help offset the path loss associated with wireless communications on carrier frequencies above 7 GHz, the directionality of beamformed signals (or "beams") presents a challenge for BSS discovery and association. For example, beamforming gains can be realized only when the AP transmits a beam in the direction of a particular STA (or a direction associated with a desired link budget). However, the direction of a STA is generally not known to the AP prior to discovery. Accordingly, new modes of BSS discovery (and association) are needed to support wireless communications on carrier frequencies above 7 GHz.

Various aspects relate generally to increasing carrier frequencies for wireless communications in WLANs, and more particularly, to BSS discovery and association techniques that support wireless communications on carrier frequencies above 7 GHz. In some aspects, an AP may utilize multiple wireless communication links to facilitate various management and control functions for directional communications. More specifically, the AP may communicate using beamforming on a wireless communication link operating at a carrier frequency above 7 GHz (also referred to as a "directional link") while offloading the BSS discovery and association procedures needed to support such communications onto a wireless communication link operating at a carrier frequency below 7 GHz (also referred to as an "anchor link"). In some implementations, the AP may perform a beamforming training operation with a STA over the directional link upon associating with the STA over the anchor link. In such implementations, the AP may communicate with the STA over the directional link using a beam derived from the beamforming training operation. In some aspects, the AP may further transmit a trigger frame on the anchor link signaling the start of the beamforming training operation and various control parameters associated therewith. In some implementations, the trigger frame may synchronize wireless communications on the anchor link with wireless communications on the directional link. For example, the trigger frame may provide a timing or frequency reference for the wireless communications on the directional link.

Particular implementations of the subject matter described in this disclosure can be implemented to realize one or more of the following potential advantages. By utilizing a directional link (operating at a carrier frequency above 7 GHz) for data communications and an anchor link (operating at a carrier frequency below 7 GHz) for management and control functions associated with the directional link, aspects of the present disclosure can leverage existing WLAN communication protocols and hardware to support wireless communications on carrier frequencies above 7 GHz. As described above, existing BSS discovery and association operations can be performed using omnidirectional communications on carrier frequencies below 7 GHz. However, directional communications may benefit from enhanced features (such as wider bandwidths or higher data rates) on carrier frequencies above 7 GHz. By offloading, onto an anchor link, the BSS discovery and association operations needed to support wireless communications on a directional link, an AP can achieve the benefits of directional communication at higher carrier frequencies and omnidirectional communication for BSS discovery and association. By synchronizing wireless communications on the anchor link with wireless communications on the directional link, an AP can further reduce the overhead and delays associated with communicating on the directional link.

Figure 6:
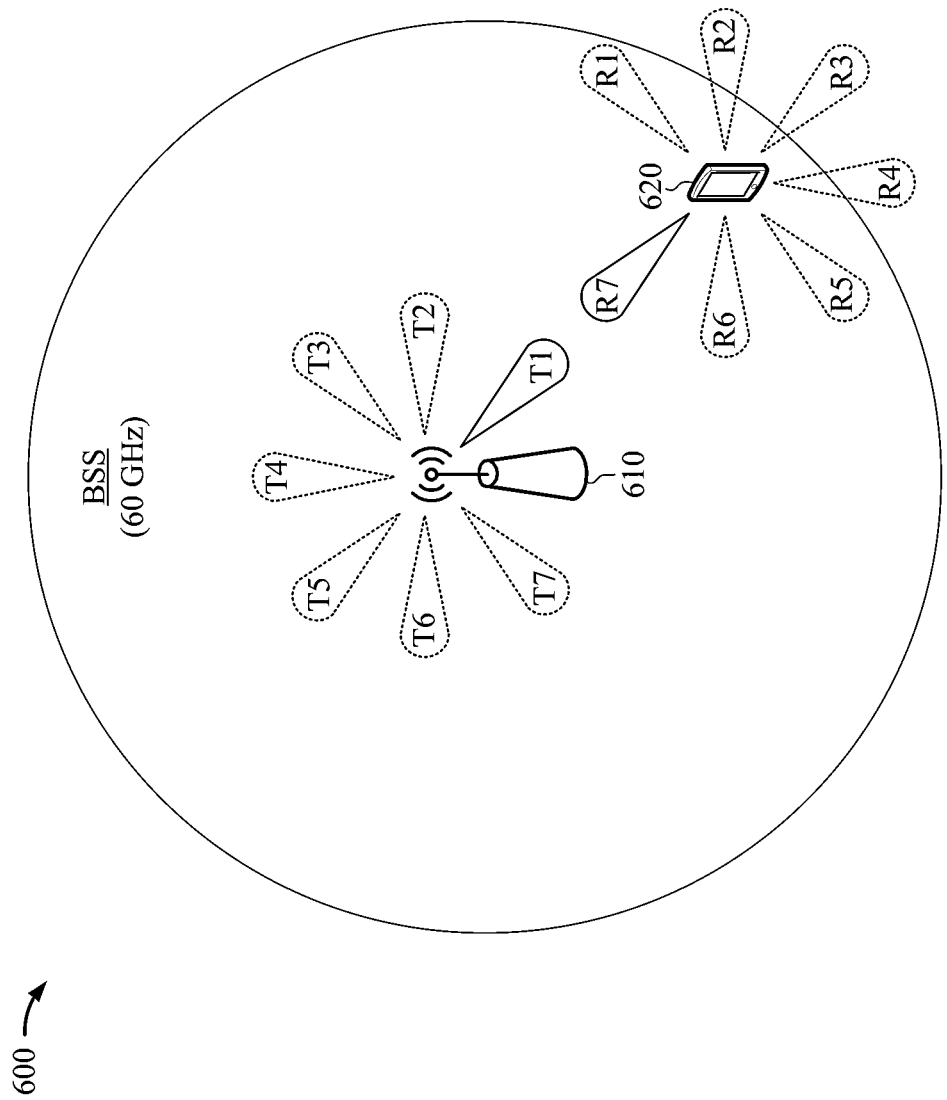
FIG. 6 shows an example communication environment that includes an AP and a STA, according to some implementations.

FIG. 6 shows an example communication environment 600 that includes an AP 610 and a STA 620, according to some implementations. In some implementations, the AP 610 may be one example of any of the APs 102 or 502 of FIGS. 1 and 5A, respectively. In some implementations, the STA 620 may be one example of any of the STAs 104 or 504 of FIGS. 1 and 5B, respectively. In the example of FIG. 6, the AP 610 is associated with a BSS that supports wireless communications at carrier frequencies above 7 GHz (such as in the 60 GHz frequency band).

In some implementations, the AP 610 may use beamforming to communicate over greater distances and mitigate the effects of path loss at carrier frequencies above 7 GHz. For example, the AP 610 may transmit packets or PPDUs via a number of antenna sectors T1-T7 (also referred to as "TX sectors") configured or tuned for TX beamforming. The antenna elements associated with each TX sector are weighted so that the energy radiated by each antenna element combines along a particular beam direction. Accordingly, each of the TX sectors T1-T7 may be tuned to a respective TX beam direction. For simplicity, the AP 610 is shown to include 7 TX sectors T1-T7. However, in actual implementations, the AP 610 may include fewer or more TX sectors than those depicted in FIG. 6.

In some implementations, the STA 620 also may use beamforming to communicate on carrier frequencies above 7 GHz. For example, the STA 620 may receive packets or PPDUs via a number of antenna sectors R1-R7 (also referred to as "RX sectors") configured or tuned for RX beamforming. The antenna elements associated with each RX sector are weighted so that the energy received by each antenna element combines along a particular beam direction. Accordingly, each of the RX sectors R1-R7 may be tuned to a respective RX beam direction. For simplicity, the STA 620 is shown to include 7 RX sectors R1-R7. However, in actual implementations, the STA 620 may include fewer or more RX sectors than those depicted in FIG. 6.

In some aspects, the AP 610 may perform a beamforming training operation with the STA 620 to determine TX and RX beam directions that optimize beamforming gains for wireless communications between the AP 610 and the STA 620. For example, the AP 610 may train its TX antennas for TX beamforming by transmitting a respective beamforming training (BFT) packet via each of the TX sectors T1-T7 and receiving feedback from the STA 620 indicating the TX sector associated with the highest TX beamforming gain. Further, the STA 620 may train its RX antennas for RX beamforming by listening for a respective BFT packet from the AP 610 via each of the RX sectors R1-R7 and determining the RX sector associated with the highest RX beamforming gain based on the received BFT packets. In some implementations, the AP 610 may further train its RX antennas (not shown for simplicity) for RX beamforming and the STA 620 may further train its TX antennas (not shown for simplicity) for TX beamforming.

As shown in FIG. 6, the AP 610 and the STA 620 may achieve optimized beamforming gains for beams transmitted via the TX sector T1 (of the AP 610) and received via the RX sector R7 (of the STA 620). By contrast, beams transmitted by the AP 610 in other TX beam directions (such as via any of the TX sectors T2-T7) may fail to reach the STA 620. Thus, the AP 610 may be unable to communicate with the STA 620 effectively at carrier frequencies above 7 GHz prior to performing a beamforming training operation. For example, without knowing the direction of the STA 620, the AP 610 may need to transmit beams in each of its TX beam directions so that at least one of the beams reaches the STA 620. Aspects of the present disclosure recognize that some management or control frames (such as used for BSS discovery) are transmitted without knowledge of the presence or direction of a receiving device (such as an AP or a STA). However, repeatedly transmitting the same management or control frames via each of the TX sectors T1-T7 consumes significant overhead and may result in inefficient usage of the wireless medium.

Aspects of the present disclosure further recognize that some wireless communication devices (including APs and STAs) are capable of multi-link operation (MLO). An MLO-capable device may be referred to as a multi-link device (MLD). For example, an AP MLD may include multiple APs each configured to communicate on a respective communication link with a non-AP MLD (also referred to as a "STA MLD"). Similarly, the non-AP MLD may include multiple STAs each configured to communicate on a respective one of the communication link with the AP MLD. In some implementations, the AP 610 and the STA 620 may utilize multiple wireless communication links to support wireless communications at carrier frequencies above 7 GHz. More specifically, the AP 610 and the STA 620 may perform at least some management and control functions (such as BSS discovery or association) via omnidirectional communications on a wireless communication link operating at a carrier frequency below 7 GHz and may communicate via directional beams on a wireless communication link operating at a carrier frequency above 7 GHz.

Figure 7:
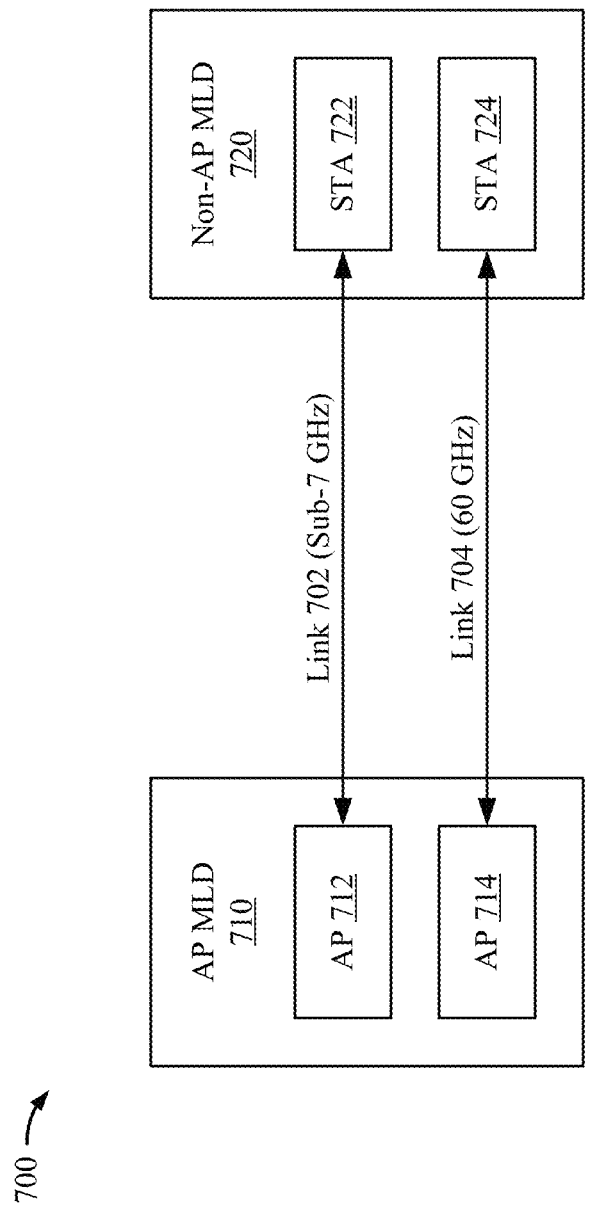
FIG. 7 shows an example communication system that includes an AP multi-link device (MLD) and a non-AP MLD, according to some implementations.

FIG. 7 shows an example communication system 700 that includes an AP MLD 710 and a non-AP MLD 720, according to some implementations. In some implementations, the AP MLD 710 may be one example of any of the APs 102, 502, or 610 of FIGS. 1, 5A, and 6, respectively. In some implementations, the non-AP MLD 720 may be one example of any of the STAs 104, 504, or 620 of FIGS. 1, 5B, and 6, respectively.

The AP MLD 710 includes multiple APs 712 and 714 associated with (or operating on) communication links 702 and 704, respectively. In the example of FIG. 7, the AP MLD 710 is shown to include 2 APs. However, in some implementations, the AP MLD 710 may include fewer or more APs than those depicted in FIG. 7. In some aspects, the APs 712 and 714 may share a common association context (through the AP MLD 710). The APs 712 and 714 also may establish their respective communication links 702 and 704 on different frequency bands. In some implementations, the AP 712 may operate at a carrier frequency below 7 GHz (such as in any of the 2.4 GHz, 5 GHz, or 6 GHz frequency bands) and the AP 714 may operate at a carrier frequency above 7 GHz (such as in the 60 GHz or 45 GHz frequency bands).

The non-AP MLD 720 includes multiple STAs 722 and 724 that may be configured to communicate on the communication links 702 and 704, respectively. In some implementations, the STA 722 may operate at a carrier frequency below 7 GHz (such as in any of the 2.4 GHz, 5 GHz, or 6 GHz frequency bands) and the STA 724 may operate at a carrier frequency above 7 GHz (such as in the 60 GHz or 45 GHz frequency bands). In the example of FIG. 7, the non-AP MLD 720 is shown to include 2 STAs. However, in some implementations, the non-AP MLD 720 may include fewer or more STAs than those depicted in FIG. 7. Existing versions of the IEEE 802.11 standard define several modes in which a non-AP MLD may operate. The various operating modes depend on the number of wireless radios associated with the non-AP MLD and the ability of the non-AP MLD to communicate (such as by transmitting or receiving) concurrently on multiple communication links.

In some implementations, the non-AP MLD 720 may include a single radio or may otherwise be capable of communicating on only one link at a time. In such implementations, the non-AP MLD 720 may operate in a multi-link single-radio (MLSR) mode or an enhanced MLSR (eMLSR) mode. A non-AP MLD operating in the eMLSR mode can listen for specific types of packets (such as buffer status report poll (BSRP) frames or multi-user request-to-send (MU-RTS) frames) on multiple links, concurrently, but can only transmit or receive on one of the links at any given time. For example, the STAs 722 and 724 may concurrently listen on their respective links 702 and 704 during a listen interval. However, if either of the STAs 722 or 724 detects a BSRP frame on its respective link, the non-AP MLD 720 subsequently tunes all of its antennas to the link on which the BSRP frame is detected. By contrast, a non-AP MLD operating in the MLSR mode can only listen to, and transmit or receive on, one communication link at any given time. For example, one of the STAs 722 or 724 must be in a power save mode any time the other STA is active.

In some other implementations, the non-AP MLD 720 may include multiple radios and may be capable of concurrent communications on each of the links 702 and 704. In such implementations, the non-AP MLD 720 may operate in a multi-link multi-radio (MLMR) simultaneous transmit and receive (STR) mode or a multi-link multi-radio non-STR (NSTR) mode. A non-AP MLD operating in the MLMR STR mode can simultaneously transmit and receive on multiple links. For example, the STA 722 may transmit or receive on the link 702 while the STA 724 concurrently transmits or receives on the link 704. More specifically, such communications may be asynchronous. In other words, the STA 722 can be transmitting on the link 702 while the STA 724 is receiving on the link 704. By contrast, a non-AP MLD operating in the MLMR NSTR mode can simultaneously transmit and receive on multiple links only if such communications are synchronous. For example, the STAs 722 and 724 may concurrently transmit on the links 702 and 704 and also may concurrently receive on the links 702 and 704. However, the STA 722 cannot be transmitting on the link 702 while the STA 724 is receiving on the link 704.

Still further, in some implementations, a non-AP MLD may include multiple radios but may be capable of concurrent communications on only a subset of the links. In such implementations, the non-AP MLD 720 may operate in an enhanced MLMR (eMLMR) mode or a hybrid eMLSR mode. A non-AP MLD operating in the eMLMR mode supports MLMR STR operation only between some pairs of links. For example, the STAs 722 and 724 may concurrently communicate on their respective links 502 and 504 in accordance with the MLMR STR mode of operation, whereas other pairs of STAs associated with the non-AP MLD 720 (not shown for simplicity) may not concurrently transmit or receive on their respective links (referred to herein as "eMLMR links"). Accordingly, such other STAs may "pool" their antennas so that each of the STAs can utilize the other STA's antennas when transmitting or receiving on one of the eMLMR links. On the other hand, a non-AP MLD operating in the hybrid eMLSR mode supports MLMR STR operation between some pairs of links and eMLSR operation between some other pairs of links.

In some aspects, the AP MLD 710 and the non-AP MLD 720 may perform various management and control functions (such as BSS discovery or association) on the link 702 and may exchange directional communications on the link 704 based on the management and control functions performed on the link 702. As such, the link 704 may be a directional link and the link 702 may be an anchor link associated with the directional link. In some implementations, the AP MLD 720 may advertise its BSS in management frames (such as beacons or probe responses) transmitted omnidirectionally on the anchor link 702. The AP MLD 710 may further associate with the non-AP MLD 720 over the anchor link 702 based on BSS information carried in the beacons or probe responses. In some implementations, the AP MLD 710 may communicate with the non-AP MLD 720 on the directional link 704 based on the association context established on the anchor link 702. More specifically, the AP MLD 710 and the non-AP MLD 720 may communicate on the directional link 704 using beamforming techniques (such as described with reference to FIG. 6).

Figure 8:
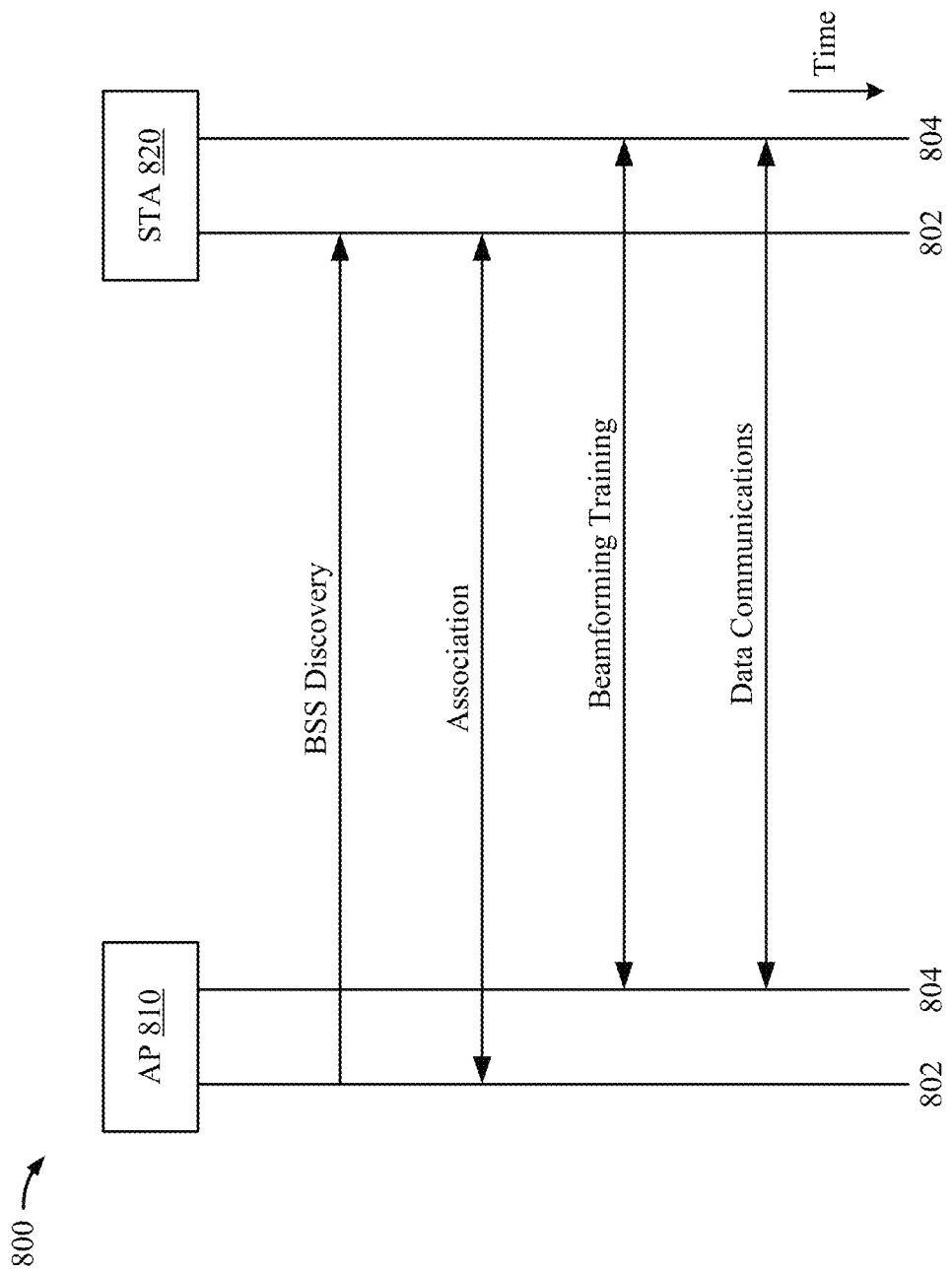
FIG. 8 shows a sequence diagram depicting example multi-link communications between an AP and a STA, according to some implementations.

FIG. 8 shows a sequence diagram 800 depicting example multi-link communications between an AP 810 and a STA 820, according to some implementations. In some implementations, the AP 810 and the STA 820 may be examples of the AP MLD 710 and the non-AP MLD 720, respectively, of FIG. 7. Each of the AP 810 and the STA 820 may be configured to communicate on multiple wireless communication links 802 and 804. With reference for example to FIG. 7, the communication links 802 and 804 may be examples of the communication links 702 and 704, respectively. As such, the link 802 may be an anchor link operating at a carrier frequency below 7 GHz and the link 804 may be a directional link operating at a carrier frequency above 7 GHz.

In the example of FIG. 8, the AP 810 and the STA 820 are initially in an unassociated state. Accordingly, the AP 810 and the STA 820 may perform BSS discovery on the anchor link 802. For example, the AP may transmit management frames (such as beacons or probe responses) on the anchor link 802 carrying BSS information advertising its BSS. Such management frames may be transmitted omnidirectionally so that any STAs within a coverage area of the AP 810 can discover the BSS. Upon discovering the BSS, the STA 820 may request to associate with the AP 810. Accordingly, the AP 810 and the STA 820 may perform an association operation over the anchor link 802. For example, the STA 820 may first initiate a low-level authentication exchange with the AP 810 over the anchor link 802. After authentication, the STA 820 may transmit an association request to the AP 810 over the anchor link 802. The AP 810 may complete the authentication process by transmitting an authentication response back to the STA 820 over the anchor link 802.

Once associated, the AP 810 may communicate with the STA 820 over the directional link 804. As such, wireless communications on the directional link 804 (such as for data transmissions) are effectively coupled to wireless communications on the anchor link 802 (such as for BSS discovery and association). In some implementations, the STA 820 (and the AP 810) may switch between the anchor link 802 and the directional link 804 using any of the techniques described with reference to FIG. 7. In some aspects, the AP 810 and the STA 820 may use beamforming techniques when communicating on the directional link 804, for example, to mitigate the effects of path loss on carrier frequencies above 7 GHz. As described with reference to FIG. 6, the AP 810 may perform a beamforming training operation with the STA 820 to determine TX and RX beam directions that optimize beamforming gain.

In some implementations, the AP 810 may initiate the beamforming training operation by transmitting a respective BFT packet on the directional link 804 via each of its TX sectors, and the STA 820 may provide feedback to the AP 810 in response to receiving one or more of the BFT packets. For example, the feedback may indicate which of the BFT packets transmitted by the AP 810 (or TX sectors) is associated with the highest signal power. In some other implementations, the STA 820 may initiate the beamforming training operation by transmitting a respective BFT packet on the directional link 804 via each of its TX sectors, and the AP 810 may provide feedback to the STA 820 in response to receiving one or more of the BFT packets. For example, the feedback may indicate which of the BFT packets transmitted by the STA 820 (or TX sectors) is associated with the highest signal power. The device initiating the beamforming training operation is referred to as the "beamforming initiator." By contrast, the device responding (or providing feedback) to the beamforming initiator is referred to as the "beamforming responder."

As a result of the beamforming training operation, the beamforming initiator selects a TX beam direction to be used for directional communications with the beamforming responder and the beamforming responder selects an RX beam direction to be used for directional communications with the beamforming initiator. In some implementations, the beamforming initiator also may select an RX beam direction to be used for directional communications with the beamforming responder and the beamforming responder also may select a TX beam direction to be used for directional communications with the beamforming initiator. Accordingly, the AP 810 may communicate with the STA 820 over the directional link using beams associated with the TX and RX directions determined as a result of the beamforming training operation. In some implementations, the AP 810 may further refine its TX or RX beam directions based on real-time communications with the STA 820. In some implementations, the STA 820 may further refine its TX or RX beam directions based on real-time communications with the AP 810.

Figure 9:
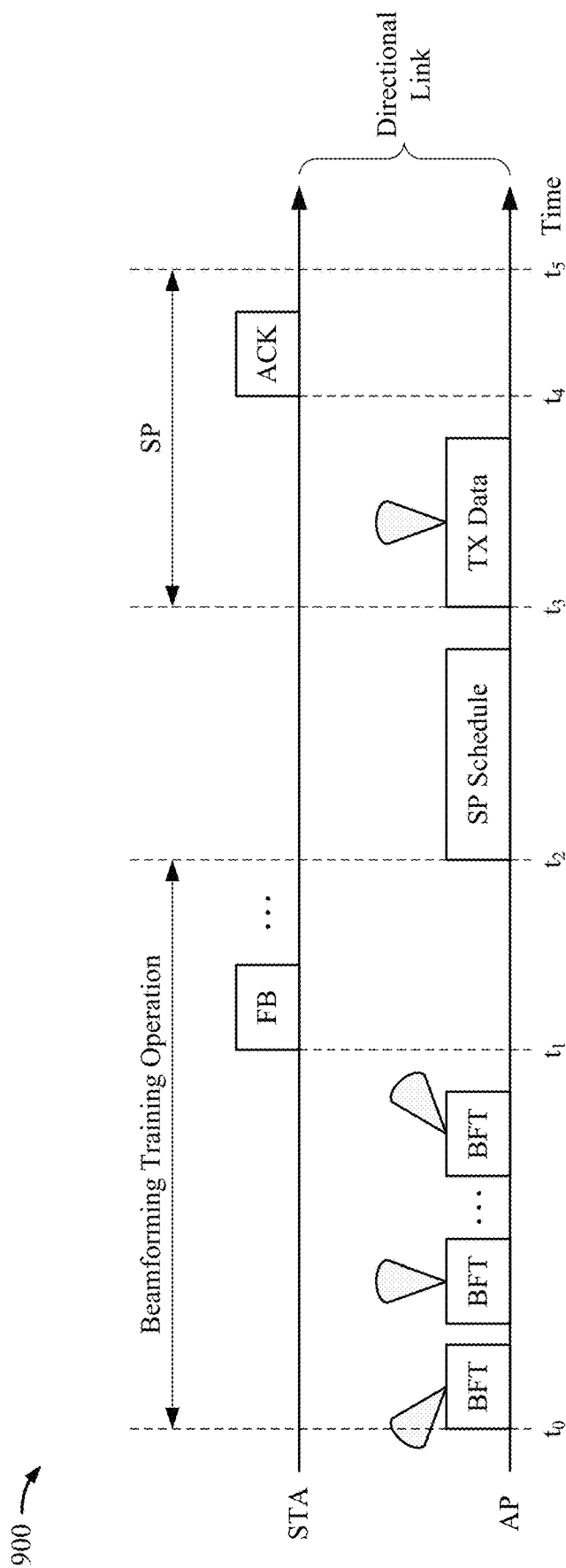
FIG. 9 shows a timing diagram depicting example wireless communications between an AP and a STA over a directional link, according to some implementations.

FIG. 9 shows a timing diagram 900 depicting example wireless communications between an AP and a STA over a directional link, according to some implementations. In some implementations, the AP may be one example of any of the APs 610 or 810 of FIGS. 6 and 8, respectively, or the AP MLD 710 of FIG. 7. In some implementations, the STA may be one example of any of the STAs 620 or 820 of FIGS. 6 and 8, respectively, or the non-AP MLD 720 of FIG. 7. With reference for example to FIG. 8, the directional link may be one example of the directional link 804. In the example of FIG. 9, the AP is associated with the STA. For example, prior to time $t_0$, the AP may perform an association operation with the STA over an anchor link (not shown for simplicity).

The AP and the STA perform a beamforming training operation on the directional link between times $t_0$ and $t_2$. In the example of FIG. 9, the AP initiates the beamforming training operation, at time $t_0$, by transmitting a number (N) of BFT packets in various TX beam directions. More specifically, at least one BFT packet may be transmitted by each TX sector associated with the AP (such as the TX sectors T1-T7 of FIG. 6). In some implementations, each of the BFT packets may carry beam management information that can be used to train the TX or RX sectors of the AP. Example beam management information may include a PPDU type, a training direction (TX or RX), a beam tracking request, the number (N) of BFT packets, a number (M) of remaining BFT packets to be transmitted, a sector identifier (ID), an antenna ID, or a number of RX antennas or sectors associated with the AP, among other examples. However, because the AP is already associated with the STA, via the anchor link, the BFT packets do not need to carry additional BSS information (such as used for BSS discovery).

The STA receives one or more of the BFT packets and compares the signal powers of the received BFT packets. At time $t_1$, the STA provides feedback (FB) to the AP indicating which of the BFT packets has the highest received signal power. For example, the feedback may include a best sector ID, a best antenna ID, or a signal-to-noise ratio (SNR) report, among other examples. Although not shown for simplicity, the STA may further train its RX antennas for RX beamforming (such as described with reference to FIG. 6). In some implementations, the STA may train its RX antennas based on the BFT packets transmitted by the AP (between times $t_0$ to $t_1$). In some other implementations, the STA may perform additional packet exchanges with the AP (between times $t_1$ and $t_2$) to train its RX antennas. In some aspects, the AP may train its RX antennas for RX beamforming based on the additional packet exchanges. In some other aspects, the STA may train its TX antennas for TX beamforming based on the additional packet exchanges.

At time $t_2$, the AP transmits service period (SP) scheduling information allocating an SP for directional communications with the STA. In the example of FIG. 9, the SP is scheduled to occur from times $t_3$ to $t_5$. In some implementations, the AP may unilaterally assign the STA to a particular SP. In some other implementations, the STA may request to be assigned to a particular SP. In such implementations, the AP and the STA may negotiate an SP schedule for subsequent wireless communications on the directional link. At time $t_3$, the AP initiates a TX data transmission to the STA using a beam determined based on the beamforming training operation. For example, the AP may transmit the TX data via the best TX sector indicated by the feedback received at time $t_1$. In some aspects, the STA may receive the TX data via the best RX sector determined through the beamforming training operation. At time $t_4$, the STA transmits an acknowledgement frame (ACK) or a block ACK to the AP acknowledging receipt of the TX data.

As shown in FIG. 9, offloading BSS discovery and association functions onto an anchor link significantly reduces the overhead and delays associated with communications on the directional link. For example, the AP does not need to transmit beacon or probe response frames, in various beam directions, advertising its BSS on the directional link. Similarly, the STA does not need to transmit probe request frames, in various beam directions, to scan for BSSs on the directional link. Rather, upon associating over the anchor link, the AP and the STA may immediately perform a beamforming training operation and proceed with data communications on the directional link. Aspects of the present disclosure recognize that the overhead and delays associated with communications on the directional link can be reduced even further by offloading, onto the anchor link, at least some of the signaling overhead associated with the beamforming training operation.

Figure 10:
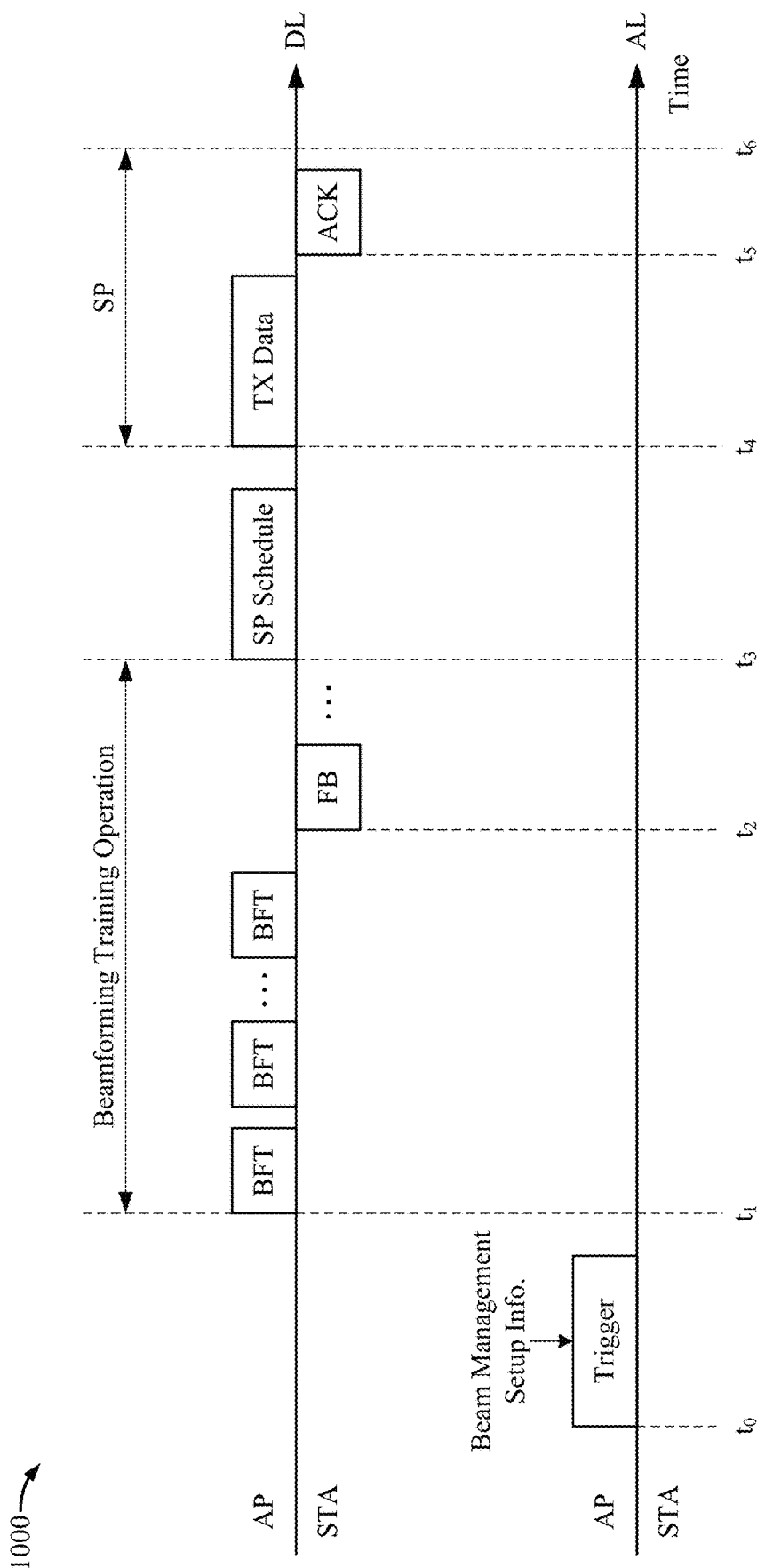
FIG. 10 shows a timing diagram depicting example wireless communications between an AP and a STA over an anchor link and a directional link, according to some implementations.

FIG. 10 shows a timing diagram 1000 depicting example wireless communications between an AP and a STA over an anchor link (AL) and a directional link (DL), according to some implementations. In some implementations, the AP may be one example of any of the APs 610 or 810 of FIGS. 6 and 8, respectively, or the AP MLD 710 of FIG. 7. In some implementations, the STA may be one example of any of the STAs 620 or 820 of FIGS. 6 and 8, respectively, or the non-AP MLD 720 of FIG. 7. With reference for example to FIGS. 7 and 8, the anchor link may be one example of any of the anchor links 702 or 802 and the directional link may be one example of any of the directional links 704 or 804. In the example of FIG. 10, the AP is associated with the STA. Thus, prior to time $t_0$, the AP may perform an association operation with the STA over the anchor link.

At time $t_0$, the AP (as the beamforming initiator) transmits a trigger frame on the anchor link signaling the start of a beamforming training operation to be performed on the directional link. In some implementations, the trigger frame may carry beam management setup information indicating one or more control parameters associated with the beamforming training operation. In the example of FIG. 10, the beamforming training operation is scheduled to occur from times $t_1$ to $t_3$. In some aspects, the trigger frame may provide a timing reference for wireless communications on the directional link. For example, the STA knows that a beamforming training operation will be performed, on the directional link, within a threshold duration of receiving the trigger frame on the anchor link. As such, the STA may operate in a power save mode on the directional link until it receives the trigger frame from the AP.

In some implementations, the beam management setup information may include a subset of the beam management information that would otherwise be included in BFT packets transmitted during the beamforming training operation (such as described with reference to FIG. 9). More specifically, the beam management setup information may include any information that is common to each of the BFT packets. Example beam management setup information may include, among other examples, a total number (N) of BFT packets to be transmitted by the AP, a number of TX and RX antennas or sectors associated with the AP, or a total number (K) of BFT packets allowed to be transmitted by the STA.

At time $t_1$, the AP initiates the beamforming training operation by transmitting N BFT packets in various TX beam directions on the directional link. More specifically, at least one BFT packet may be transmitted by each TX sector associated with the AP (such as the TX sectors T1-T7 of FIG. 6). In some implementations, each of the BFT packets may carry beam management information that can be used to train the TX or RX sectors of the AP. More specifically, the beam management information may include any information not already signaled via the trigger frame. Example beam management information may include a PPDU type, a training direction (TX or RX), a beam tracking request, a number (M) of remaining BFT packets to be transmitted, a sector ID, or an antenna ID, among other examples. Thus, transmitting a trigger frame on the anchor link further reduces the overhead associated with each of the BFT packets (compared to the BFT packets of FIG. 9).

The STA receives one or more of the BFT packets and compares the signal powers of the received BFT packets. At time $t_2$, the STA provides feedback (FB) on the directional link indicating which of the BFT packets has the highest received signal power. For example, the feedback may include a best sector ID, a best antenna ID, or an SNR report, among other examples. In some implementations, the STA may further train its RX antennas for RX beamforming based on the BFT packets transmitted by the AP (between times $t_1$ to $t_2$). In some other implementations, the STA may perform additional packet exchanges with the AP (between times $t_2$ and $t_3$) to train its RX antennas. In some aspects, the AP may train its RX antennas for RX beamforming based on the additional packet exchanges. In some other aspects, the STA may train its TX antennas for TX beamforming based on the additional packet exchanges.

At time $t_3$, the AP transmits SP scheduling information on the directional link allocating an SP for directional communications with the STA. In the example of FIG. 10, the SP is scheduled to occur from times $t_4$ to $t_6$. In some implementations, the AP may unilaterally assign the STA to a particular SP. In some other implementations, the STA may request to be assigned to a particular SP. In such implementations, the AP and the STA may negotiate an SP schedule for subsequent wireless communications on the directional link. At time $t_4$, the AP initiates a TX data transmission on the directional link using a beam determined based on the beamforming training operation. For example, the AP may transmit the TX data via the best TX sector indicated by the feedback received at time $t_2$. In some aspects, the STA may receive the TX data via the best RX sector determined through the beamforming training operation. At time $t_5$, the STA transmits an ACK or a block ACK on the directional link acknowledging receipt of the TX data.

As described with reference to FIG. 10, the trigger frame transmitted on the anchor link (at time $t_0$) may provide a timing reference for communications on the directional link. In some implementations, the trigger frame may further provide a frequency reference for the communications on the directional link. In such implementations, the same local oscillator (LO) of the AP may drive the carrier frequencies used for wireless communications by the AP on each of the anchor link and the directional link and the same LO of the STA may drive the carrier frequencies used for wireless communications by the STA on each of the anchor link and the directional link. As a result, the carrier frequency offset (CFO) on the anchor link is associated with the CFO on the directional link. For example, the STA may estimate the CFO on the anchor link based on the trigger frame received at time $t_0$ and may use the CFO estimate associated with the anchor link to narrow the range of possible CFO estimates for the directional link (such as to within a few kilohertz).

Aspects of the present disclosure recognize that wireless communications on higher carrier frequencies may suffer from greater phase noise compared to wireless communications on lower frequency bands. For example, increasing the carrier frequency from 5.8 GHz to 60 GHz results in a 10× increase in phase noise. Aspects of the present disclosure further recognize that the phase noise can be mitigated by increasing the subcarrier spacing (SCS) between modulated subcarriers. As described with reference to FIG. 2A, existing WLAN packet formats include an L-STF that is modulated on every $4^{th}$ subcarrier spanning a given bandwidth to support CFO estimations up to 2 subcarriers apart. Further, the LOs implemented by existing WLAN transmitters and receivers are required to be accurate up to ±20 ppm. As such, existing WLAN architectures can support CFOs up to ±40 ppm (between the transmitter and the receiver), which is equivalent to ±2.4 MHz in the 60 GHz frequency band and ±1.8 MHz in the 45 GHz frequency band. To support CFOs up to ±2.4 MHZ, the SCS associated with L-STF should be greater than or equal to 1.2 MHZ.

In some aspects, a wireless communication device (such as an AP or a STA) may up-clock a PPDU for transmission on carrier frequencies above 7 GHz, where the PPDU conforms to an existing PPDU format associated with a sub-7 GHz frequency band. As used herein, the term "up-clocking" refers to increasing the frequency of a clock signal used to convert the PPDU between the frequency domain and the time domain (beyond a frequency ($f_0$) associated with the existing PPDU format), and the ratio (K) of the up-clocked frequency ($f_s$) to $f_0$ is referred to herein as the "up-clocking ratio" (where $K=f_s/f_0$). For example, the clock signal may be provided to a digital-to-analog converter (DAC) that samples the output of an inverse fast Fourier transform (IFFT). The IFFT transforms a number (N) of modulated subcarriers, representing the PPDU, to N time-domain samples. In some aspects, the ratio of the clock signal frequency $f_s$ to the IFFT size ($N_{IFFT}$) may result in an SCS greater than or equal to 1.2 MHz, where the SCS represents a spacing between the subcarriers on which a PHY preamble (including L-STF) of the PPDU is modulated. More specifically, the SCS as a result of up-clocking ($SCS_U$) may be a multiple of an SCS associated with the existing PPDU format ($SCS_0$), where $SCS_U=K*SCS_0$).

Figure 11:
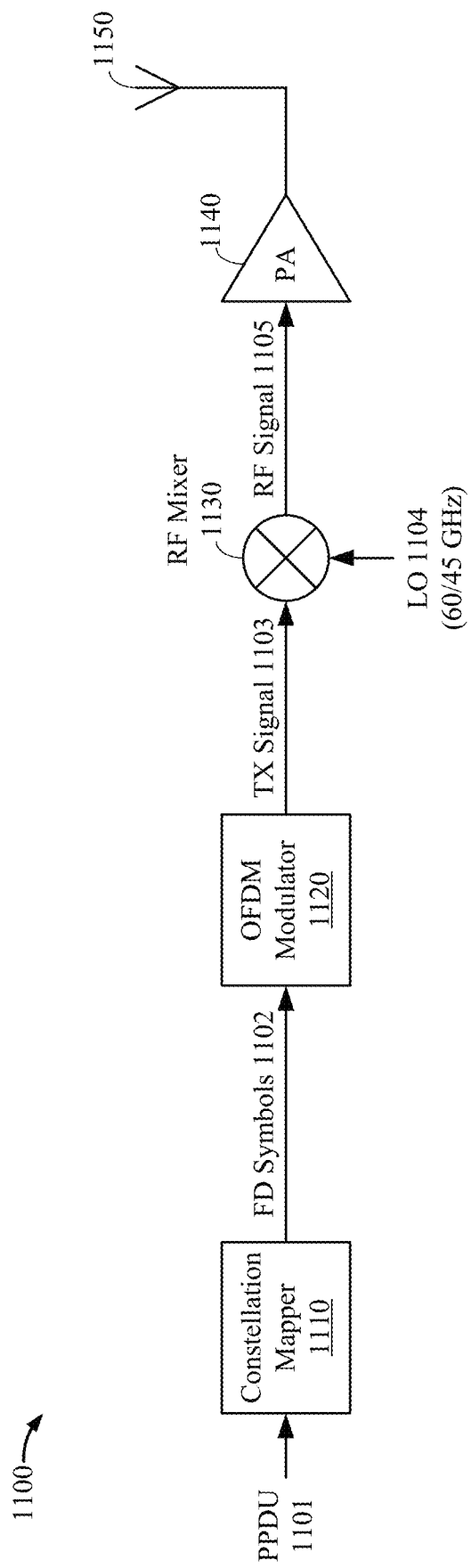
FIG. 11 shows a block diagram of an example transmit (TX) processing chain for a wireless communication device, according to some implementations.

FIG. 11 shows a block diagram of an example TX processing chain 1100 for a wireless communication device, according to some implementations. The TX processing chain 1100 is configured to process a PPDU 1101 for transmission, as a radio frequency (RF) signal 1105, on a directional link. In some aspects, the PPDU 1101 may be one example of the PPDU 300 of FIG. 3. In some implementations, the wireless communication device may be one example of any of the APs 610 or 810 of FIGS. 6 and 8, respectively, or the AP MLD 710 of FIG. 7. In some other implementations, the wireless communication device may be one example of any of the STAs 620 or 820 of FIGS. 6 and 8, respectively, or the non-AP MLD 720 of FIG. 7. Accordingly, the directional link may be one example of any of the directional links 704 or 804 of FIGS. 7 and 8, respectively. For simplicity, only a single spatial stream of the TX processing chain 1100 is depicted in FIG. 11. In actual implementations, the TX processing chain 1100 may include any number of spatial streams.

The TX processing chain 1100 includes a constellation mapper 1110, an orthogonal frequency-division multiplexing (OFDM) modulator 1120, an RF mixer 1130, and a power amplifier (PA) 1140. The constellation mapper 1110 maps the PPDU 1101 to one or more frequency-domain (FD) symbols 1102 associated with a modulation scheme. Example suitable modulation schemes include binary phase-shift keying (BPSK), quadrature phase-shift keying (QPSK), and quadrature amplitude modulation (QAM). The OFDM modulator 1120 modulates the FD symbols 1102 onto a set of orthogonal subcarriers and converts the modulated subcarriers to a time-varying TX signal 1103. The RF mixer 1130 up-converts the TX signal 1103 to a carrier frequency, and the power amplifier 1140 amplifies the resulting RF signal 1105 for transmission via one or more antennas 1150. For example, the RF mixer 1130 may modulate the TX signal 1103 onto an LO signal 1104 that oscillates at the carrier frequency. In the example of FIG. 11, the carrier frequency associated with the LO signal 1104 is shown to be higher than 7 GHz. In some implementations, the carrier frequency may be in the 60 GHz frequency band. In some other implementations, the carrier frequency may be in the 45 GHz frequency band.

As described above, many existing WLAN architectures are designed for wireless communications on carrier frequencies below 7 GHz (such as in the 2.4 GHz, 5 GHz, or 6 GHz frequency bands). In some aspects, existing WLAN hardware may be repurposed to support wireless communications on carrier frequencies above 7 GHz. For example, the TX processing chain 1100 may receive the LO signal 1104 from a local oscillator that is accurate up to ±20 ppm. As described above, increasing the carrier frequency of the LO signal 1104 also increases the phase noise associated with the RF signal 1105. For example, operating the local oscillator at 60 GHz can result in a CFO of ±2.4 MHz between the transmitter and the receiver. According to existing versions of the IEEE 802.11 standard, the PHY preamble of the PPDU 1101 includes an L-STF having a 1× symbol duration associated with an SCS equal to 312.5 KHz that can support CFO estimations up to 2 subcarriers apart. As used herein, the term "1×SCS" refers to the subcarrier spacing between the subcarriers to which L-STF is mapped. Thus, to support CFOs up to ±2.4 MHz, the 1×SCS associated with the PPDU 1101 should be greater than or equal to 1.2 MHZ.

Aspects of the present disclosure recognize that any SCS greater than or equal to 1.2 MHz may not be suitable for wireless communications on sub-7 GHz carrier frequencies. As such, existing WLAN communication protocols for sub-7 GHz wireless communications (such as the IEEE 802.11be, 11ax, 11ac, and earlier amendments of the IEEE 802.11 standard) do not define a PPDU format or tone plan having an SCS greater than or equal to 1.2 MHz. In some aspects, the TX processing chain 1100 may receive a PPDU 1101 that is formatted for transmission on a sub-7 GHz carrier frequency and may up-clock the PPDU 1101 to a wider bandwidth that is suitable for transmission on a carrier frequency above 7 GHz (such as in the 60 GHz or 45 GHz frequency bands). For example, the wider bandwidth is achieved by spreading out the subcarriers to which the PPDU 1101 is mapped. Thus, in some implementations, the TX processing chain 1100 may up-clock the PPDU 1101 so that the 1×SCS associated with the PPDU 1101 is greater than or equal to 1.2 MHZ.

In some aspects, the PPDU 1101 may conform to a PPDU format defined by the IEEE 802.11be (or 11ax) amendment of the IEEE 802.11 standard. For example, the PPDU 1101 may conform to an 11be PPDU format associated with a 20 MHz, 40 MHz, or 80 MHz channel bandwidth (in a sub-7 GHz frequency band) and may be up-clocked for transmission over an 80 MHz, 160 MHZ, 320 MHz, 480 MHZ, 640 MHZ, 960 MHz, 1.28 GHz, 1.92 GHz, or 2.56 GHz bandwidth wireless channel in the 60 GHz or 45 GHz frequency band. In some aspects, the PPDU format may be used to overcome path loss on the directional link when the PPDU 1101 is transmitted to a receiving device that is not configured for RX beamforming (such as during a beamforming training operation). For example, the IEEE 802.11be amendment of the IEEE 802.11 standard defines an extended range (ER) single-user (SU) PPDU format that boosts the power of the PPDU to support wireless communications over greater distances. Thus, in some implementations, the PPDU 1101 may conform to an ER SU PPDU format.

Figure 12A:
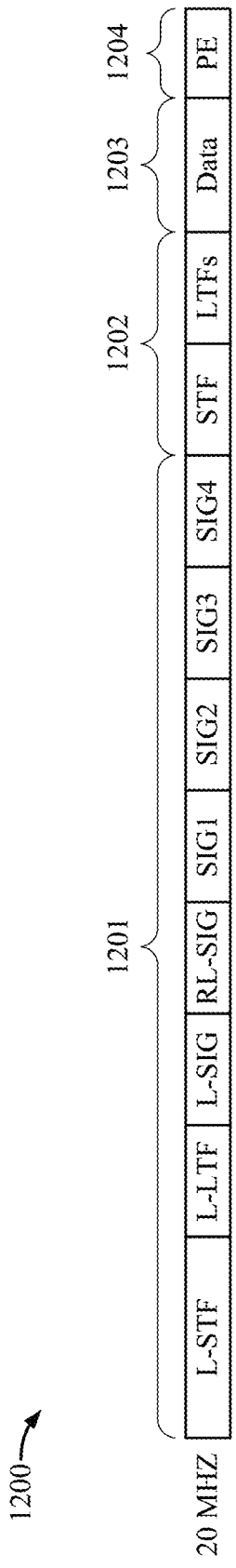
FIG. 12A shows an example PPDU formatted in accordance with a legacy PPDU format.

FIG. 12A shows another example PPDU 1200 formatted in accordance with a legacy PPDU format. In the example of FIG. 12A, the legacy PPDU format is an ER SU PPDU format associated with a 20 MHz channel bandwidth. The PPDU 1200 includes a PHY preamble, having a first portion 1201 and a second portion 1202, followed by a data portion 1203 and a packet extension (PE) 1204. The first preamble portion 1201 includes an L-STF, an L-LTF, an L-SIG, a repetition of L-SIG (RL-SIG), and four non-legacy signal fields (SIG1-SIG4). The second preamble portion 1202 includes a non-legacy short training field (STF) and one or more non-legacy long training fields (LTFs).

The IEEE 802.11be amendment of the IEEE 802.11 standard defines each of the non-legacy signal fields SIG1-SIG4 as a universal signal field (U-SIG) and defines the remaining non-legacy fields STF and LTFs as Extremely High Throughput (EHT) fields EHT-STF and EHT-LTFs, respectively. Further, the STF sequence associated with L-STF is repeated (2×) in the time domain to produce an "extended L-STF." In some implementations, one or more of the signal fields L-SIG, RL-SIG, or SIG1-SIG4 may be repurposed to carry signaling or other information specific to wireless communications on carrier frequencies above 7 GHz (such as beam management information). According to the 11be PPDU format, the data portion 1203 (and the PE 1204) is mapped to each contiguous data subcarrier associated with a 256-subcarrier tone plan (which includes 234 data subcarriers and 8 pilot subcarriers). In contrast, L-STF is mapped to every $4^{th}$ data subcarrier associated with a 64-subcarrier tone plan while the remainder of the first preamble portion 1201 is mapped to each contiguous data subcarrier associated with the 64-subcarrier tone plan. As such, the SCS associated with L-STF is 4× larger than the SCS associated with the data portion 1203.

Figure 12B:
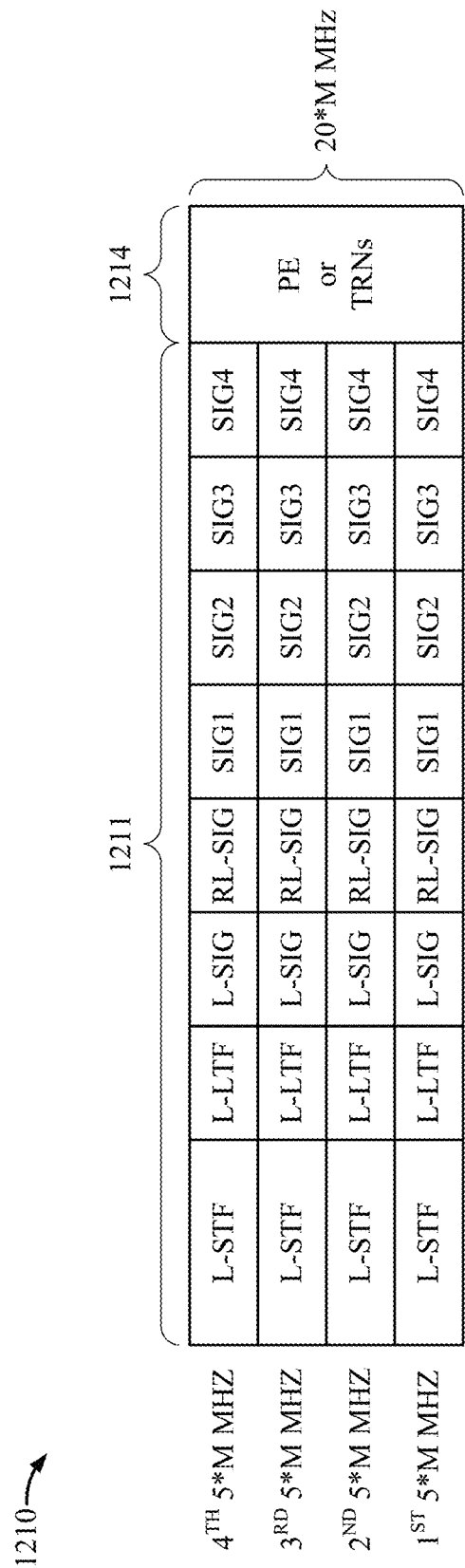
FIG. 12B shows an example up-clocked PPDU based on the PPDU format depicted in FIG. 12A, according to some implementations.

FIG. 12B shows an example up-clocked PPDU 1210 based on the PPDU format depicted in FIG. 12A, according to some implementations. The PPDU 1210 includes a PHY preamble 1211 followed by a PE or training (TRN) field 1214. In some aspects, the PPDU 1210 may represent an up-clocking of the PPDU 1200 by a factor of M. As such, the PHY preamble 1211 and the PE or TRN field 1214 may be examples of the first preamble portion 1201 and the PE 1204, respectively, of FIG. 12A.

In some implementations, the PPDU 1210 may be used as a BFT packet for beamforming training operations when a receiving device (or a beamforming responder) is not configured for RX beamforming. In such implementations, the beam management information may be carried in the signal fields L-SIG, RL-SIG, or SIG1-SIG4. Thus, as shown in FIG. 12B, the PPDU 1210 may not include the data portion 1203 or the second preamble portion 1202 of the PPDU 1200. As described with reference to FIG. 12A, the SCS associated with L-STF is 4× larger than the SCS associated with the PE 1204. Thus, the first preamble portion 1201 can be up-clocked by a factor of M/4, and duplicated 4× in the frequency domain, to achieve the same SCS in L-STF as in the PE 1204. In some aspects, the up-clocking may be performed by the OFDM modulator 1120 of FIG. 11. For example, the OFDM modulator 1120 may up-clock the first preamble portion 1201 by a factor of M/4 and may up-clock the remainder of the PPDU 1200 by a factor of M. As a result, the PE or TRN field 1214 is spread over a 20*M MHz bandwidth and the PHY preamble 1211 is duplicated on four 5*M MHz sub-bands spanning the 20*M MHz bandwidth.

Figure 13:
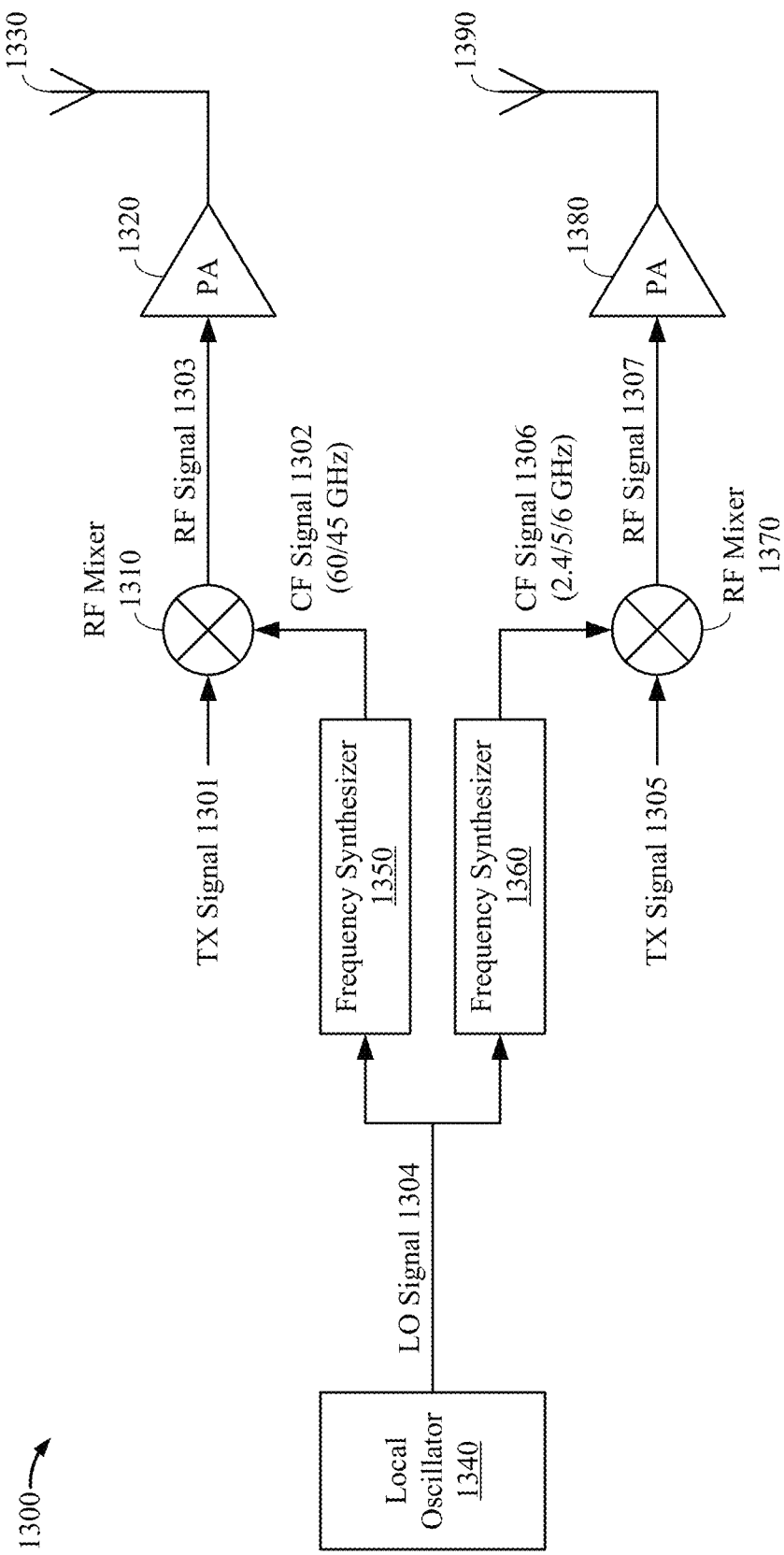
FIG. 13 shows a block diagram of an example analog front-end (AFE) for a wireless communication device, according to some implementations.

FIG. 13 shows a block diagram of an example AFE 1300 for a wireless communication device, according to some implementations. The TX processing chain 1300 is configured to transmit TX signals 1301 and 1305 on a directional link and an anchor link, respectively. In some implementations, the wireless communication device may be one example of any of the APs 610 or 810 of FIGS. 6 and 8, respectively, or the AP MLD 710 of FIG. 7. In some other implementations, the wireless communication device may be one example of any of the STAs 620 or 820 of FIGS. 6 and 8, respectively, or the non-AP MLD 720 of FIG. 7. With reference for example to FIGS. 7 and 8, the anchor link may be one example of any of the anchor links 702 or 802 and the directional link may be one example of any of the directional links 704 or 804.

The AFE 1300 includes RF mixers 1310 and 1370, power amplifiers 1320 and 1380, a local oscillator 1340, and frequency synthesizers 1350 and 1360. The RF mixer 1310 up-converts the TX signal 1301 to a carrier frequency associated with the directional link, and the power amplifier 1320 amplifies the resulting RF signal 1303 for transmission via one or more antennas 1330. For example, the RF mixer 1310 may modulate the TX signal 1301 onto a carrier frequency (CF) signal 1302 that oscillates at the desired carrier frequency. In the example of FIG. 13, the carrier frequency associated with the CF signal 1302 is shown to be higher than 7 GHz. In some implementations, the carrier frequency may be in the 60 GHz frequency band. In some other implementations, the carrier frequency may be in the 45 GHz frequency band.

The RF mixer 1370 up-converts the TX signal 1305 to a carrier frequency associated with the anchor link, and the power amplifier 1380 amplifies the resulting RF signal 1307 for transmission via one or more antennas 1390. For example, the RF mixer 1370 may modulate the TX signal 1305 onto a CF signal 1306 that oscillates at the desired carrier frequency. In the example of FIG. 13, the carrier frequency associated with the CF signal 1306 is shown to be lower than 7 GHz. In some implementations, the carrier frequency may be in the 2.4 GHz frequency band. In some other implementations, the carrier frequency may be in the 5 GHz frequency band. Still further, in some implementations, the carrier frequency may be in the 6 GHz frequency band.

In the example of FIG. 13, the CF signals 1302 and 1306 are each derived from an LO signal 1304 produced by the local oscillator 1340. For example, the LO signal 1304 may be provided as inputs to the frequency synthesizers 1350 and 1360 which generate the CF signals 1302 and 1306, respectively, based on the LO signal 1304. As such, the anchor link and the directional link are "synchronized in frequency."

Because the CF signals 1302 and 1306 are driven by the same local oscillator 1340, the CFO on the directional link can be estimated within a threshold range (such as a few kilohertz) based on the estimated CFO on the anchor link. Due to the reduced pull-in range, a receiving device can estimate the CFO on the directional link within a shorter STF duration (compared to the duration needed to estimate the CFO on a directional link that is not synchronized in frequency with an anchor link). Accordingly, the TX signal 1301 can represent PPDUs having a shorter L-STF duration than the PPDUs 1200 or 1210 of FIGS. 12A and 12B, respectively (even when the PPDUs are transmitted to a receiving device that is not configured for RX beamforming).

As described with reference to FIG. 13, synchronizing the CF signals 1302 and 1306 to the same local oscillator 1340 can reduce the overhead and delays associated with communications on the directional link. Aspects of the present disclosure recognize that the overhead and delays associated with communications on the directional link can be reduced even further by synchronizing the timing of the TX signals 1301 and 1305 to the same clock. In some aspects, the wireless communication device may include a clock (not shown for simplicity) that controls a timing of wireless communications on the directional link and the anchor link. For example, the same clock controls the times at which the TX signals 1301 are transmitted on the directional link and the times at which the TX signals 1305 are transmitted on the anchor link. As such, the anchor link and the directional link are "synchronized in time."

In some aspects, the anchor link and the directional link may be synchronized in both time and frequency. In such aspects, a receiving device may calibrate the timing and frequency of communications on the directional link based on packets received on the anchor link. For example, the receiving device can estimate the CFO on the directional link based only on an estimated CFO on the anchor link. In some implementations, a transmitting device may transmit trigger frames on the anchor link signaling a timing of additional packets to be transmitted on the directional link. In such implementations, the receiving device need not perform packet detection on the directional link to receive the additional packets. Rather, the receiving device can determine the timing and CFO associated with the additional packets based on the timing and CFO associated with the trigger frames received on the anchor link. As a result, the additional packets transmitted on the directional link can carry significantly less overhead than packets otherwise transmitted without timing and frequency information obtained from the anchor link.

Figure 14A:
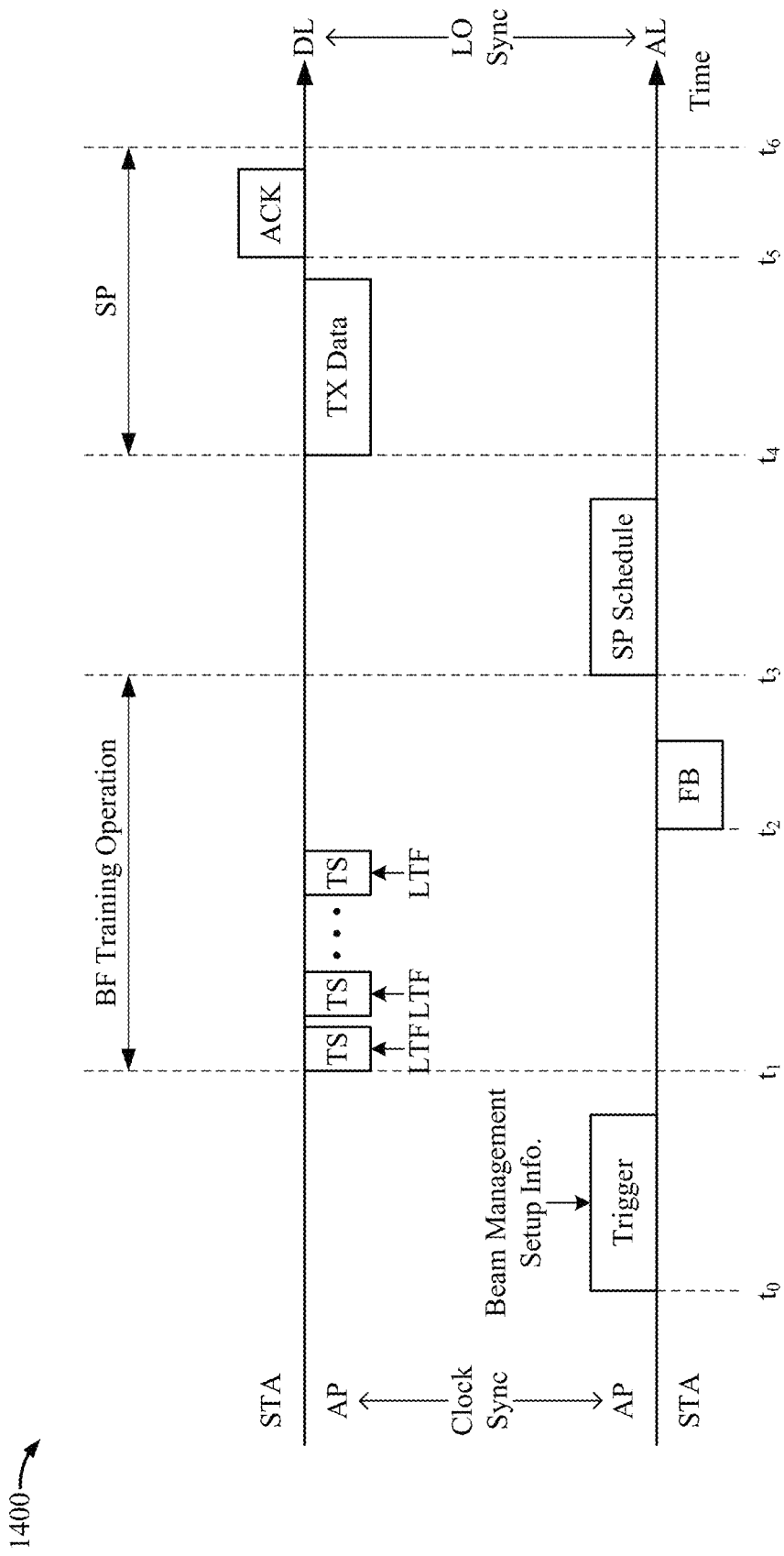
FIG. 14A shows a timing diagram depicting example wireless communications between an AP and a STA over an anchor link and a directional link, according to some implementations.

FIG. 14A shows a timing diagram 1400 depicting example wireless communications between an AP and a STA over an anchor link (AL) and a directional link (DL), according to some implementations. In some implementations, the AP may be one example of any of the APs 610 or 810 of FIGS. 6 and 8, respectively, or the AP MLD 710 of FIG. 7. In some implementations, the STA may be one example of any of the STAs 620 or 820 of FIGS. 6 and 8, respectively, or the non-AP MLD 720 of FIG. 7. With reference for example to FIGS. 7 and 8, the anchor link may be one example of any of the anchor links 702 or 802 and the directional link may be one example of any of the directional links 704 or 804. In the example of FIG. 14A, the AP is associated with the STA. Thus, prior to time $t_0$, the AP may perform an association operation with the STA over the anchor link.

In the example of FIG. 14A, the directional link and the anchor link are synchronized in both time and frequency (such as described with reference to FIG. 13). In other words, the same local oscillator drives the carrier frequencies used for wireless communications by the AP on each of the anchor link and the directional link and the same clock controls the timing of wireless communications by the AP on each of the anchor link and the directional link. Similarly, the same local oscillator drives the carrier frequencies used for wireless communications by the STA on each of the anchor link and the directional link and the same clock controls the timing of wireless communications by the STA on each of the anchor link and the directional link.

At time $t_0$, the AP (as the beamforming initiator) transmits a trigger frame on the anchor link signaling the start of a beamforming training operation to be performed on the directional link. In the example of FIG. 14A, the beamforming training operation is scheduled to occur from times $t_1$ to $t_3$. In some implementations, the trigger frame may carry beam management setup information indicating one or more parameters associated with the beamforming training operation. For example, the beam management setup information may include a subset of the beam management information that would otherwise be included in BFT packets transmitted during the beamforming training operation. The beam management setup information may include any information that is common to each of the BFT packets. Example beam management setup information may include, among other examples, a total number (N) of BFT packets to be transmitted by the AP, a number of TX and RX antennas or sectors associated with the AP, or a total number (K) of BFT packets allowed to be transmitted by the STA.

In some aspects, the trigger frame may further provide a timing and frequency reference for wireless communications on the directional link. For example, the beam management setup information may include timing and frequency information indicating a timing of wireless communications on the directional link and a CFO associated therewith. In other words, the STA knows that a beamforming training operation will be performed on the directional link at time $t_1$ based on the timing information included in or derived from receiving the trigger frame. Further, the STA may estimate a CFO associated with wireless communications on the directional link based on the frequency information included in the trigger frame (such as an L-STF). Accordingly, L-STF can be absent from each BFT packet transmitted on the directional link when receiving a trigger frame associated with the beamforming training operation. In the example of FIG. 14A, each of the BFT packets is depicted as a short training sequence (TS).

At time $t_1$, the AP initiates the beamforming training operation by transmitting N training sequences in various TX beam directions on the directional link. More specifically, at least one training sequence may be transmitted by each TX sector associated with the AP (such as the TX sectors T1-T7 of FIG. 6). In some aspects, the STA may determine the sector IDs (of the AP) from which the training sequences are transmitted based on the trigger frame received on the anchor link (at time $t_0$) and a timing of each training sequence (such as indicated by a timestamp). In some other aspects, each of the training sequences may carry beam management information explicitly signaling one or more training parameters. More specifically, the beam management information may include any information not already signaled via the trigger frame. In some implementations, each of the training sequences may consist of a single LTF (such as L-LTF) designed to indicate one or more beam management parameters (such as a sector ID). In some other implementations, each of the training sequences may consist of an LTF and a signal field (such as L-SIG) to carry additional beam management information (such as a training direction, a beam tracking request, a number (M) of remaining training sequences to be transmitted, or an antenna ID).

The STA receives one or more of the training sequences and compares the signal powers of the received training sequences. At time $t_2$, the STA provides feedback (FB) on the anchor link indicating which of the training sequences has the highest received signal power. For example, the feedback may include a best sector ID, a best antenna ID, or an SNR report, among other examples. In some implementations, the STA may further train its RX antennas for RX beamforming based on the training sequences transmitted by the AP (between times $t_1$ to $t_2$). In some other implementations, the STA may perform additional packet exchanges with the AP (between times $t_2$ and $t_3$) to train its RX antennas. In some aspects, the AP may train its RX antennas for RX beamforming based on the additional packet exchanges. In some other aspects, the STA may train its TX antennas for TX beamforming based on the additional packet exchanges.

At time $t_3$, the AP transmits SP scheduling information allocating an SP for directional communications with the STA on the directional link. In some aspects, the SP scheduling information may be transmitted on the anchor link (such as shown in FIG. 14A). Because the anchor link is synchronized with the directional link in time, the STA knows that the SP is scheduled to occur on the directional link from times $t_4$ to $t_6$ based on the SP scheduling information received on the anchor link. In some other aspects, the SP scheduling information may be transmitted on the directional link (such as described with reference to FIGS. 9 and 10). In some implementations, the AP may unilaterally assign the STA to a particular SP. In some other implementations, the STA may request to be assigned to a particular SP. In such implementations, the AP and the STA may negotiate an SP schedule for subsequent wireless communications on the directional link.

At time $t_4$, the AP initiates a TX data transmission on the directional link using a beam determined based on the beamforming training operation. For example, the AP may transmit the TX data via the best TX sector indicated by the feedback received at time $t_2$. In some aspects, the STA may receive the TX data via the best RX sector determined through the beamforming training operation. At time $t_5$, the STA transmits an ACK or a block ACK acknowledging receipt of the TX data. In some implementations, the ACK or block ACK may be transmitted on the directional link (such as shown in FIG. 14A). In some other implementations, the ACK or block ACK may be transmitted on an anchor link.

Figure 14B:
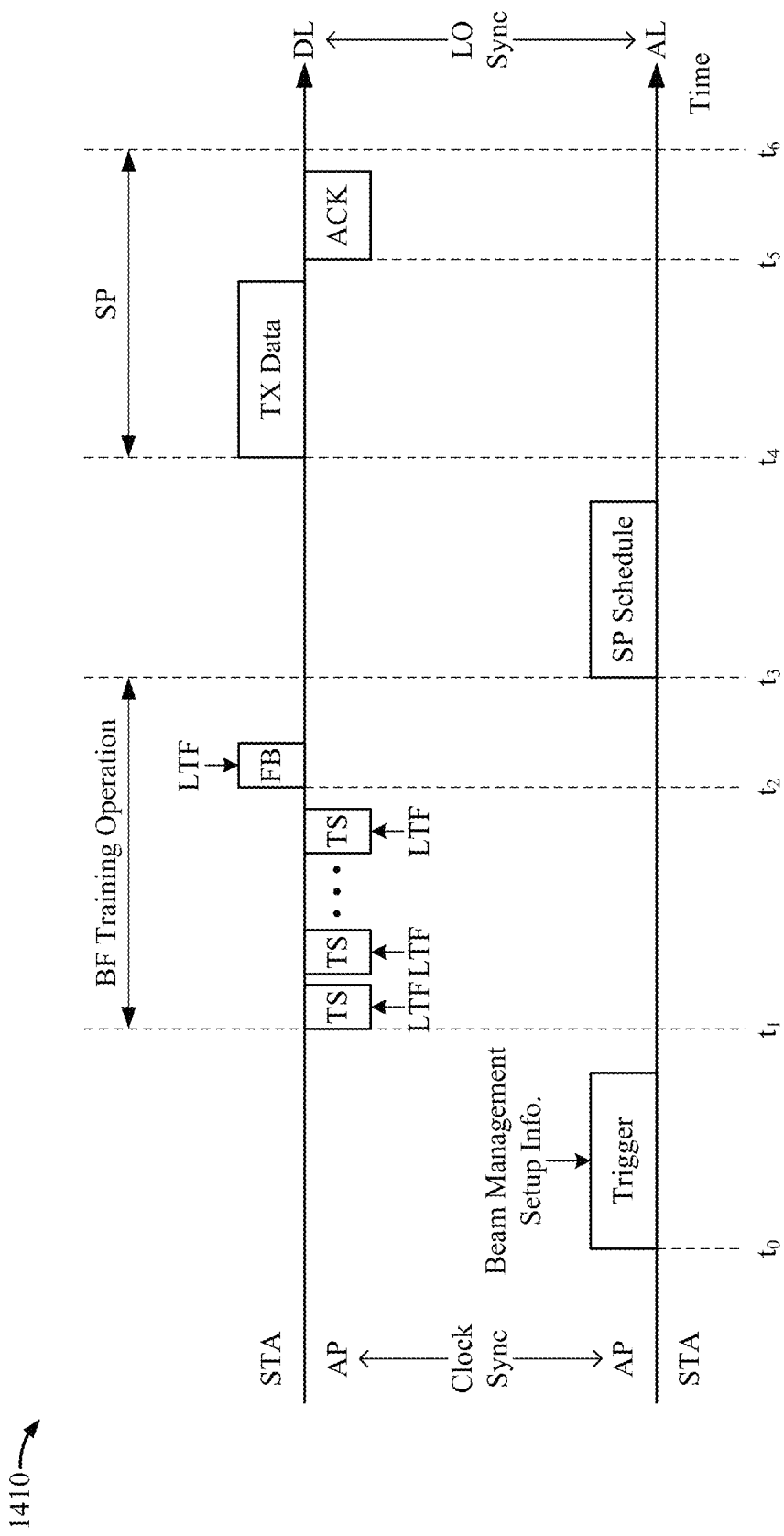
FIG. 14B shows another timing diagram depicting example wireless communications between an AP and a STA over an anchor link and a directional link, according to some implementations.

FIG. 14B shows another timing diagram 1410 depicting example wireless communications between an AP and a STA over an anchor link (AL) and a directional link (DL), according to some implementations. In some implementations, the AP may be one example of any of the APs 610 or 810 of FIGS. 6 and 8, respectively, or the AP MLD 710 of FIG. 7. In some implementations, the STA may be one example of any of the STAs 620 or 820 of FIGS. 6 and 8, respectively, or the non-AP MLD 720 of FIG. 7. With reference for example to FIGS. 7 and 8, the anchor link may be one example of any of the anchor links 702 or 802 and the directional link may be one example of any of the directional links 704 or 804. In the example of FIG. 14B, the AP is associated with the STA. Thus, prior to time $t_0$, the AP may perform an association operation with the STA over the anchor link.

In the example of FIG. 14B, the directional link and the anchor link are synchronized in both time and frequency (such as described with reference to FIG. 13). In other words, the same local oscillator drives the carrier frequencies used for wireless communications by the AP on each of the anchor link and the directional link and the same clock controls the timing of wireless communications by the AP on each of the anchor link and the directional link. Similarly, the same local oscillator drives the carrier frequencies used for wireless communications by the STA on each of the anchor link and the directional link and the same clock controls the timing of wireless communications by the STA on each of the anchor link and the directional link.

At time $t_0$, the AP (as the beamforming initiator) transmits a trigger frame on the anchor link signaling the start of a beamforming training operation to be performed on the directional link. In the example of FIG. 14B, the beamforming training operation is scheduled to occur from times $t_1$ to $t_3$. In some implementations, the trigger frame may carry beam management setup information indicating one or more parameters associated with the beamforming training operation. For example, the beam management setup information may include a subset of the beam management information that would otherwise be included in BFT packets transmitted during the beamforming training operation. The beam management setup information may include any information that is common to each of the BFT packets. Example beam management setup information may include, among other examples, a total number (N) of BFT packets to be transmitted by the AP, a number of TX and RX antennas or sectors associated with the AP, or a total number (K) of BFT packets allowed to be transmitted by the STA.

In some aspects, the trigger frame may further provide a timing and frequency reference for wireless communications on the directional link. For example, the beam management setup information may include timing and frequency information indicating a timing of wireless communications on the directional link and a CFO associated therewith. In other words, the STA knows that a beamforming training operation will be performed on the directional link at time $t_1$ based on the timing information included in or derived from receiving the trigger frame. Further, the STA may estimate a CFO associated with wireless communications on the directional link based on the frequency information included in the trigger frame (such as an L-STF). Accordingly, L-STF can be absent from each BFT packet transmitted on the directional link when receiving a trigger frame associated with the beamforming training operation. In the example of FIG. 14A, each of the BFT packets is depicted as a short training sequence (TS).

At time $t_1$, the AP initiates the beamforming training operation by transmitting N training sequences in various TX beam directions on the directional link. More specifically, at least one training sequence may be transmitted by each TX sector associated with the AP (such as the TX sectors T1-T7 of FIG. 6). In some aspects, the STA may determine the sector IDs (of the AP) from which the training sequences are transmitted based on the trigger frame received on the anchor link (at time t0) and a timing of each training sequence (such as indicated by a timestamp). In some other aspects, each of the training sequences may carry beam management information explicitly signaling one or more training parameters. More specifically, the beam management information may include any information not already signaled via the trigger frame. In some implementations, each of the training sequences may consist of a single LTF (such as L-LTF) designed to indicate one or more beam management parameters (such as a sector ID). In some other implementations, each of the training sequences may consist of an LTF and a signal field (such as L-SIG) to carry additional beam management information (such as a training direction, a beam tracking request, a number (M) of remaining training sequences to be transmitted, or an antenna ID).

The STA receives one or more of the training sequences and compares the signal powers of the received training sequences. At time $t_2$, the STA provides feedback (FB) on the directional link indicating which of the training sequences has the highest received signal power. In some implementations, the feedback may consist of a single LTF (such as L-LTF) designed to indicate the best sector ID. In some other implementations, the feedback may consist of an LTF and a signal field (such as L-SIG) to carry additional information, such as a best antenna ID or an SNR report. In some implementations, the STA may further train its RX antennas for RX beamforming based on the training sequences transmitted by the AP (between times $t_1$ to $t_2$). In some other implementations, the STA may perform additional packet exchanges with the AP (between times $t_2$ and $t_3$) to train its RX antennas. In some aspects, the AP may train its RX antennas for RX beamforming based on the additional packet exchanges. In some other aspects, the STA may train its TX antennas for TX beamforming based on the additional packet exchanges.

At time $t_3$, the AP transmits SP scheduling information allocating an SP for directional communications with the STA on the directional link. In some aspects, the SP scheduling information may be transmitted on the anchor link (such as shown in FIG. 14B). Because the anchor link is synchronized with the directional link in time, the STA knows that the SP is scheduled to occur on the directional link from times $t_4$ to to based on the SP scheduling information received on the anchor link. In some other aspects, the SP scheduling information may be transmitted on the directional link (such as described with reference to FIGS. 9 and 10). In some implementations, the AP may unilaterally assign the STA to a particular SP. In some other implementations, the STA may request to be assigned to a particular SP. In such implementations, the AP and the STA may negotiate an SP schedule for subsequent wireless communications on the directional link.

At time $t_4$, the AP initiates a TX data transmission on the directional link using a beam determined based on the beamforming training operation. For example, the AP may transmit the TX data via the best TX sector indicated by the feedback received at time $t_2$. In some aspects, the STA may receive the TX data via the best RX sector determined based on the beamforming training operation. At time $t_5$, the STA transmits an ACK or a block ACK acknowledging receipt of the TX data. In some implementations, the ACK or block ACK may be transmitted on the directional link (such as shown in FIG. 14B). In some other implementations, the ACK or block ACK may be transmitted on an anchor link.

Figure 15:
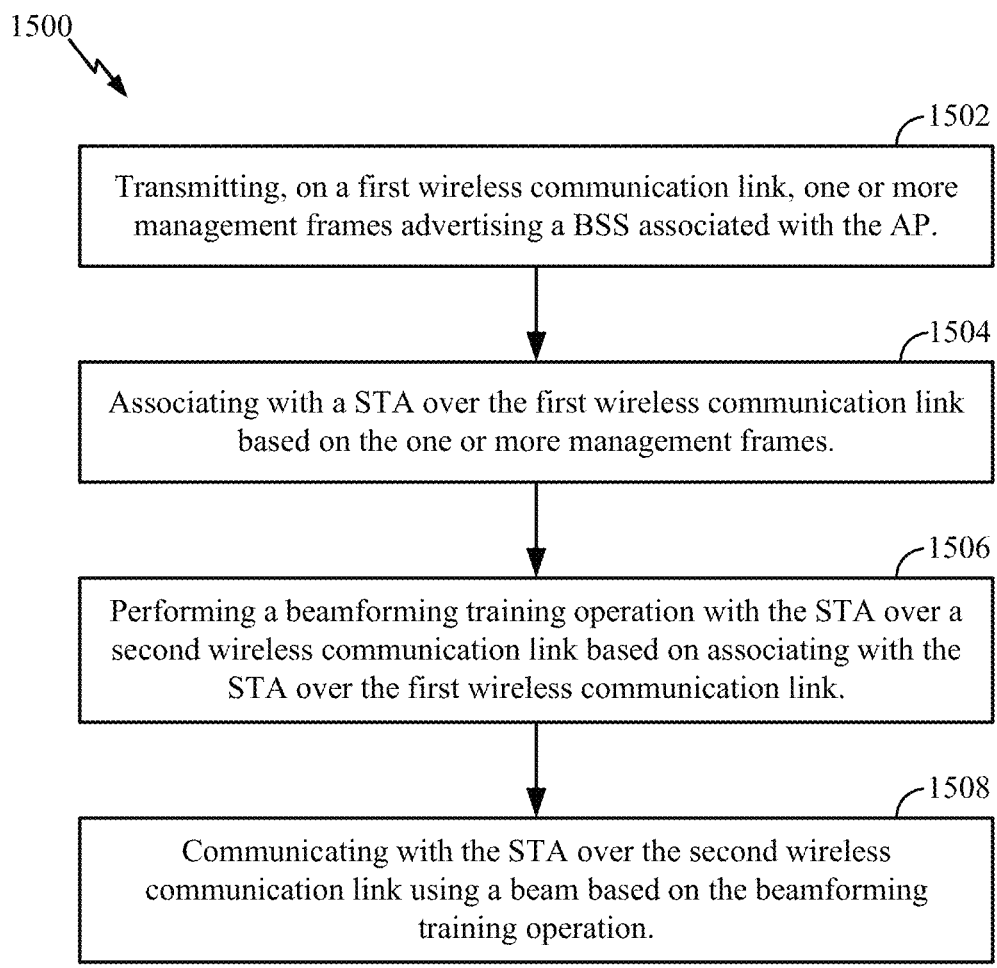
FIG. 15 shows a flowchart illustrating an example process for wireless communication that supports a 60 GHz operating mode for wireless local area networks (WLANs).

FIG. 15 shows a flowchart illustrating an example process 1500 for wireless communication that supports a 60 GHz operating mode for WLANs. In some implementations, the process 1500 may be performed by an AP, such as any one of the APs 610 or 810 of FIGS. 6 and 8, respectively, or the AP MLD 710 of FIG. 7.

In some implementations, the process 1500 begins in block 1502 with transmitting, on a first wireless communication link, one or more management frames advertising a BSS associated with the AP. In block 1504, the process 1500 proceeds with associating with a STA over the first wireless communication link based on the one or more management frames. In block 1506, the process 1500 proceeds with performing a beamforming training operation with the STA over a second wireless communication link based on associating with the STA over the first wireless communication link. In block 1508, the process 1500 proceeds with communicating with the STA over the second wireless communication link using a beam based on the beamforming training operation. In some implementations, the first wireless communication link may operate at a carrier frequency below 7 GHz and the second wireless communication link may operate at a carrier frequency above 7 GHz.

In some aspects, the process 1500 may further include exchanging beam management setup information with the STA over the first wireless communication link, where the beam management setup information signals the start of the beamforming training operation. In some implementations, the beam management setup information may include frequency information indicating a CFO associated with wireless communications on the second wireless communication link. In some implementations, the beam management setup information may include timing information indicating a timing of wireless communications on the second wireless communication link. In some implementations, the process 1500 may further include transmitting, on the first wireless communication link, scheduling information allocating an SP for the communications with the STA over the second wireless communication link.

In some aspects, the performing of the beamforming training operation may include transmitting a plurality of PPDUs in a plurality of directions, respectively, on the second wireless communication link, where each PPDU of the plurality of PPDUs consists of a single PHY training field; and receiving feedback from the STA responsive to transmitting the plurality of PPDUs, where the feedback indicates a direction for tuning a plurality of antennas. In some implementations, the AP may communicate with the STA over the second wireless communication link via the plurality of antennas tuned in the direction indicated by the feedback. In some implementations, the feedback may be carried in a PPDU consisting of a single PHY training field. In some other implementations, the feedback may be carried in a PPDU consisting of a single PHY training field and a single PHY signal field. In some implementations, the feedback may be received on the second wireless communication link. In some other implementations, the feedback may be received on the first wireless communication link.

Figure 16:
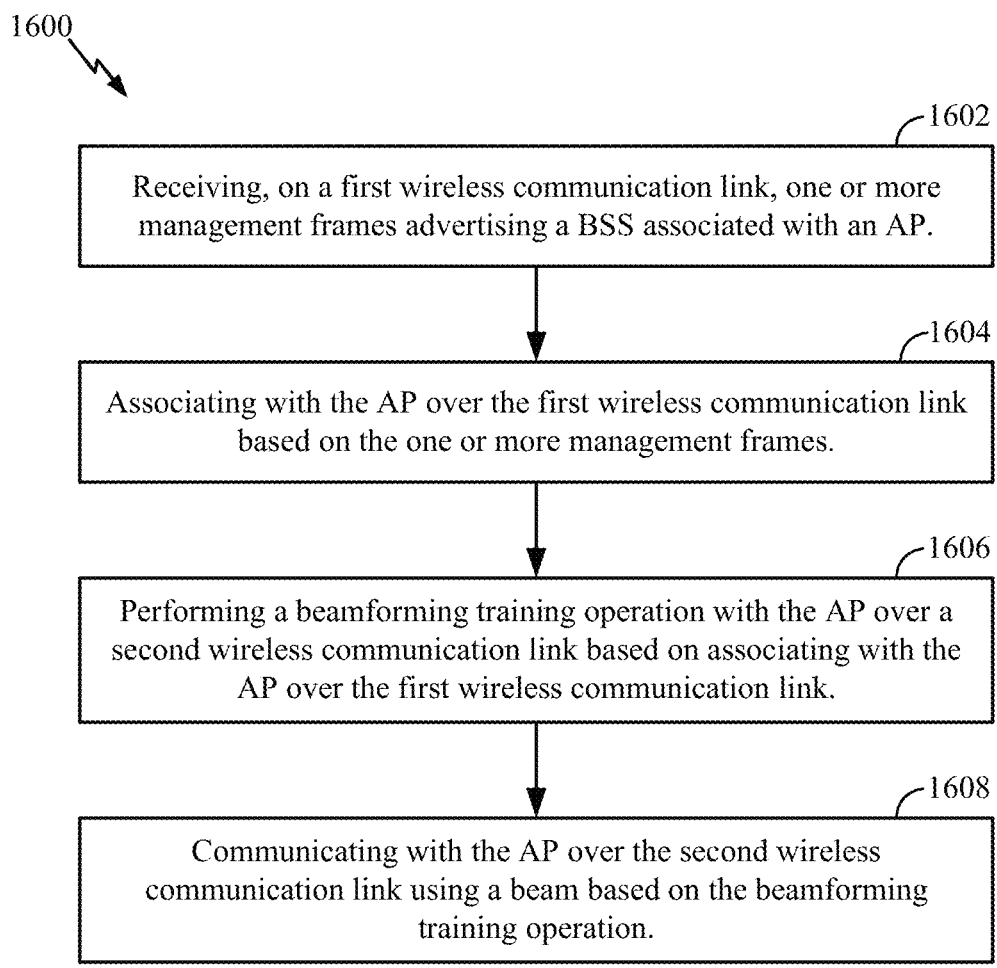
FIG. 16 shows a flowchart illustrating an example process for wireless communication that supports a 60 GHz operating mode for WLANs.

FIG. 16 shows a flowchart illustrating an example process 1600 for wireless communication that supports a 60 GHz operating mode for WLANs. In some implementations, the process 1600 may be performed by a STA, such as any one of the STAs 620 or 820 of FIGS. 6 and 8, respectively, or the non-AP MLD 720 of FIG. 7.

In some implementations, the process 1600 begins in block 1602 with receiving, on a first wireless communication link, one or more management frames advertising a BSS associated with an AP. In block 1604, the process 1600 proceeds with associating with the AP over the first wireless communication link based on the one or more management frames. In block 1606, the process 1600 proceeds with performing a beamforming training operation with the AP over a second wireless communication link based on associating with the AP over the first wireless communication link. In block 1608, the process 1600 proceeds with communicating with the AP over the second wireless communication link using a beam based on the beamforming training operation. In some implementations, the first wireless communication link may operate at a carrier frequency below 7 GHz and the second wireless communication link may operate at a carrier frequency above 7 GHz.

In some aspects, the process 1600 may further include exchanging beam management setup information with the AP over the first wireless communication link, the beam management setup information signaling the start of the beamforming training operation. In some implementations, the beam management setup information may include frequency information indicating a CFO associated with wireless communications on the second wireless communication link. In some implementations, the beam management setup information may include timing information indicating a timing of wireless communications on the second wireless communication link. In some implementations, the process 1600 may further include receiving, on the first wireless communication link, scheduling information allocating an SP for the communications with the AP over the second wireless communication link.

In some aspects, the performing of the beamforming training operation may include transmitting a plurality of PPDUs in a plurality of directions, respectively, on the second wireless communication link, where each PPDU of the plurality of PPDUs consists of a single PHY training field; and receiving feedback from the AP responsive to transmitting the plurality of PPDUs, where the feedback indicates a direction for tuning a plurality of antennas. In some implementations, the STA may communicate with the AP over the second wireless communication link via the plurality of antennas tuned in the direction indicated by the feedback. In some implementations, the feedback may be carried in a PPDU consisting of a single PHY training field. In some other implementations, the feedback may be carried in a PPDU consisting of a single PHY training field and a single PHY signal field. In some implementations, the feedback may be received on the second wireless communication link. In some other implementations, the feedback may be received on the first wireless communication link.

Figure 17:
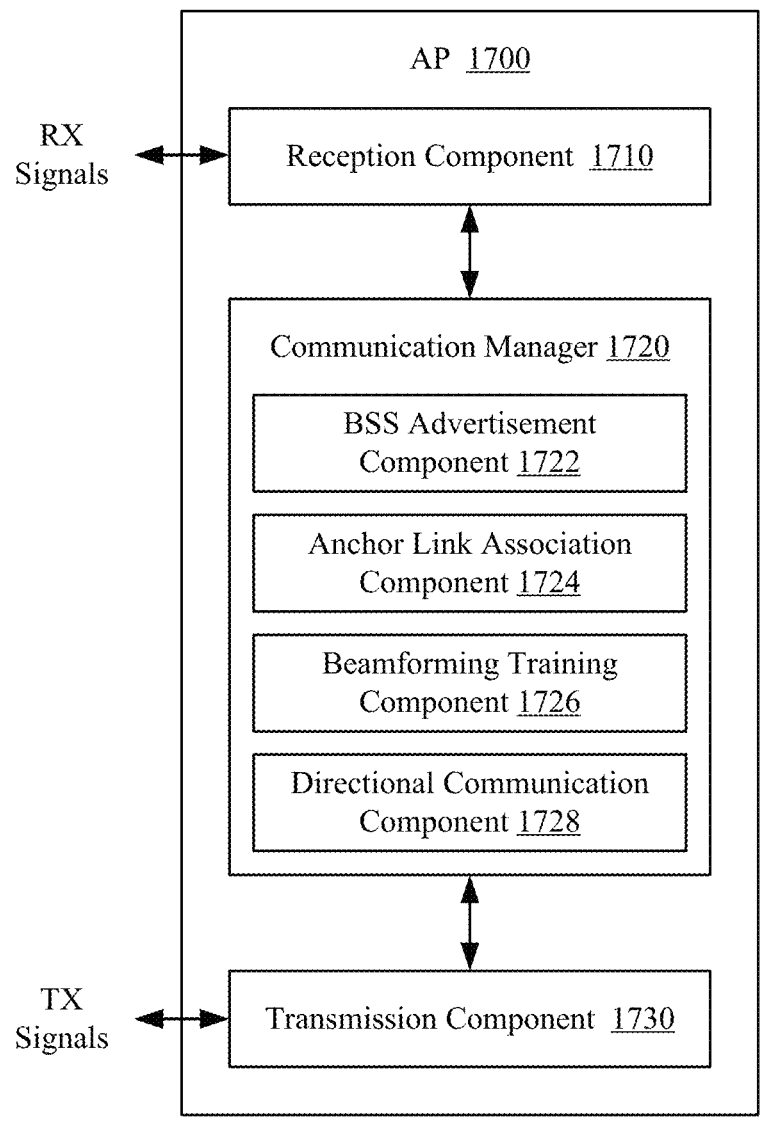
FIG. 17 shows a block diagram of an example AP according to some implementations.

FIG. 17 shows a block diagram of an example AP 1700 according to some implementations. In some implementations, the AP 1700 is configured to perform the process 1500 described above with reference to FIG. 15. The AP 1700 can be an example implementation of the AP 502 or the WCD 510 described above with reference to FIG. 5A. For example, the AP 1700 can be a chip, SoC, chipset, package or device that includes at least one processor and at least one modem (for example, a Wi-Fi (IEEE 802.11) modem or a cellular modem).

The AP 1700 includes a reception component 1710, a communication manager 1720, and a transmission component 1730. The communication manager 1720 further includes a BSS advertisement component 1722, an anchor link association component 1724, a beamforming training component 1726, and a directional communication component 1728. Portions of one or more of the components 1722-1728 may be implemented at least in part in hardware or firmware. In some implementations, at least some of the components 1722, 1724, 1726, or 1728 are implemented at least in part as software stored in a memory (such as the memory 540 of FIG. 5A or the memory 408 of FIG. 4). For example, portions of one or more of the components 1722-1728 can be implemented as non-transitory instructions (or "code") executable by a processor (such as the application processor 530 of FIG. 5A or the processor 406 of FIG. 4) to perform the functions or operations of the respective component.

The reception component 1710 is configured to receive RX signals, over a wireless channel, from one or more STAs. The transmission component 1730 is configured to transmit TX signals, over a wireless channel, to one or more STAs. The communication manager 1720 is configured to control or manage communications with one or more STAs. In some implementations, the BSS advertisement component 1722 may transmit, on a first wireless communication link, one or more management frames advertising a BSS associated with the AP; the anchor link association component 1724 may associate with a STA over the first wireless communication link based on the one or more management frames; the beamforming training component 1726 may perform a beamforming training operation with the STA over a second wireless communication link based on associating with the STA over the first wireless communication link; and the directional communication component 1728 may communicate with the STA over the second wireless communication link using a beam based on the beamforming training operation.

Figure 18:
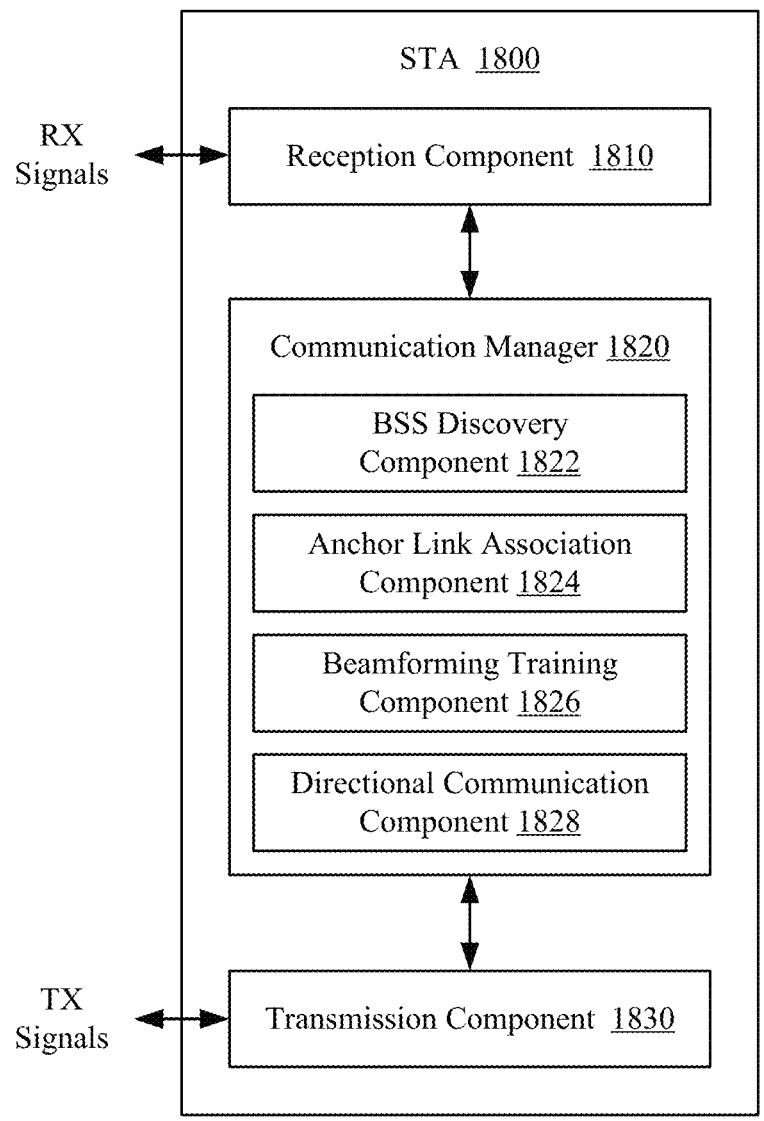
FIG. 18 shows a block diagram of an example STA according to some implementations.

FIG. 18 shows a block diagram of an example STA 1800 according to some implementations. In some implementations, the STA 1800 is configured to perform the process 1600 described above with reference to FIG. 16. The STA 1800 can be an example implementation of the STA 504 or the WCD 515 described above with reference to FIG. 5B. For example, the STA 1800 can be a chip, SoC, chipset, package or device that includes at least one processor and at least one modem (for example, a Wi-Fi (IEEE 802.11) modem or a cellular modem).

The STA 1800 includes a reception component 1810, a communication manager 1820, and a transmission component 1830. The communication manager 1820 further includes a BSS discovery component 1822, an anchor link association component 1824, a beamforming training component 1826, and a directional communication component 1828. Portions of one or more of the components 1822-1828 may be implemented at least in part in hardware or firmware. In some implementations, at least some of the components 1822, 1824, 1826, or 1828 are implemented at least in part as software stored in a memory (such as the memory 545 of FIG. 5B or the memory 408 of FIG. 4). For example, portions of one or more of the components 1822-1828 can be implemented as non-transitory instructions (or "code") executable by a processor (such as the application processor 535 of FIG. 5B or the processor 406 of FIG. 4) to perform the functions or operations of the respective component.

The reception component 1810 is configured to receive RX signals, over a wireless channel, from an AP. The transmission component 1830 is configured to transmit TX signals, over a wireless channel, to an AP. The communication manager 1720 is configured to control or manage communications with an AP. In some implementations, the BSS discovery component 1822 may receive, on a first wireless communication link, one or more management frames advertising a BSS associated with an AP; the anchor link association component 1824 may associate with the AP over the first wireless communication link based on the one or more management frames; the beamforming training component 1826 may perform a beamforming training operation with the AP over a second wireless communication link based on associating with the AP over the first wireless communication link; and the directional communication component 1828 may communicate with the AP over the second wireless communication link using a beam based on the beamforming training operation.

Implementation examples are described in the following numbered clauses:

1. A method for wireless communication by a wireless access point (AP), including:
transmitting, on a first wireless communication link, one or more management frames advertising a basic service set (BSS) associated with the AP;
associating with a wireless station (STA) over the first wireless communication link based on the one or more management frames;
performing a beamforming training operation with the STA over a second wireless communication link based on associating with the STA over the first wireless communication link; and
communicating with the STA over the second wireless communication link using a beam based on the beamforming training operation.

2. The method of clause 1, where the first wireless communication link operates at a carrier frequency below 7 GHz and the second wireless communication link operates at a carrier frequency above 7 GHz.

3. The method of any of clauses 1 or 2, further including:
exchanging beam management setup information with the STA over the first wireless communication link, the beam management setup information signaling the start of the beamforming training operation.

4. The method of any of clauses 1-3, where the beam management setup information includes frequency information indicating a carrier frequency offset (CFO) associated with wireless communications on the second wireless communication link.

5. The method of any of clauses 1-4, wherein the beam management setup information includes timing information indicating a timing of wireless communications on the second wireless communication link.

6. The method of any of clauses 1-5, where the performing of the beamforming training operation comprises:
transmitting a plurality of physical layer (PHY) convergence protocol (PLCP) protocol data unit (PPDUs) in a plurality of directions, respectively, on the second wireless communication link, each PPDU of the plurality of PPDUs consisting of a single PHY training field; and
receiving feedback from the STA responsive to transmitting the plurality of PPDUs, the feedback indicating a direction for tuning a plurality of antennas.

7. The method of any of clauses 1-6, where the feedback is carried in a PPDU consisting of a single PHY training field.

8. The method of any of clauses 1-6, where the feedback is carried in a PPDU consisting of a single PHY training field and a single PHY signal field.

9. The method of any of clauses 1-8, where the feedback is received on the second wireless communication link.

10. The method of any of clauses 1-8, where the feedback is received on the first wireless communication link.

11. The method of any of clauses 1-10, where the AP communicates with the STA over the second wireless communication link via the plurality of antennas tuned in the direction indicated by the feedback.

12. The method any of clauses 1-11, further including:
transmitting, on the first wireless communication link, scheduling information allocating a service period (SP) for the communications with the STA over the second wireless communication link.

13. A wireless access point (AP) including:
at least one memory; and
at least one processor communicatively coupled with the at least one memory, the at least one processor configured to cause the AP to:
transmit, on a first wireless communication link, one or more management frames advertising a basic service set (BSS) associated with the AP;
associate with a wireless station (STA) over the first wireless communication link based on the one or more management frames;
perform a beamforming training operation with the STA over a second wireless communication link based on associating with the STA over the first wireless communication link; and
communicate with the STA over the second wireless communication link using a beam based on the beamforming training operation.

14. The AP of clause 13, further including:
a local oscillator (LO) configured to drive the carrier frequencies associated with each of the first wireless communication link and the second wireless communication link.

15. The AP of any of clauses 13 or 14, further including:
a clock configured to control a timing of communications on each of the first wireless communication link and the second wireless communication link.

16. A method for wireless communication by a wireless station (STA), including:
receiving, on a first wireless communication link, one or more management frames advertising a basic service set (BSS) associated with an access point (AP);
associating with the AP over the first wireless communication link based on the one or more management frames;
performing a beamforming training operation with the AP over a second wireless communication link based on associating with the AP over the first wireless communication link; and
communicating with the AP over the second wireless communication link using a beam based on the beamforming training operation.

17. The method of clause 16, where the first wireless communication link operates at a carrier frequency below 7 GHz and the second wireless communication link operates at a carrier frequency above 7 GHz.

18. The method of any of clauses 16 or 17, further including:
exchanging beam management setup information with the AP over the first wireless communication link, the beam management setup information signaling the start of the beamforming training operation.

19. The method of any of clauses 16-18, where the beam management setup information includes frequency information indicating a carrier frequency offset (CFO) associated with wireless communications on the second wireless communication link.

20. The method of any of clauses 16-19, where the beam management setup information includes timing information indicating a timing of wireless communications on the second wireless communication link.

21. The method of any of clauses 16-20, where the performing of the beamforming training operation includes:
transmitting a plurality of physical layer (PHY) convergence protocol (PLCP) protocol data unit (PPDUs) in a plurality of directions, respectively, on the second wireless communication link, each PPDU of the plurality of PPDUs consisting of a single PHY training field; and receiving feedback from the AP responsive to transmitting the plurality of PPDUs, the feedback indicating a direction for tuning a plurality of antennas.

22. The method of any of clauses 16-21, where the feedback is carried in a PPDU consisting of a single PHY training field.

23. The method of any of clauses 16-21, where the feedback is carried in a PPDU consisting of a single PHY training field and a single PHY signal field.

24. The method of any of clauses 16-23, where the feedback is received on the second wireless communication link.

25. The method of any of clauses 16-23, where the feedback is received on the first wireless communication link.

26. The method of any of clauses 16-25, where the STA communicates with the AP over the second wireless communication link via the plurality of antennas tuned in the direction indicated by the feedback.

27. The method of any of clauses 16-26, further including:
receiving, on the first wireless communication link, scheduling information allocating a service period (SP) for the communications with the AP over the second wireless communication link.

28. A wireless station (STA) including:
at least one memory; and
at least one processor communicatively coupled with the at least one memory, the at least one processor configured to cause the STA to:
    receive, on a first wireless communication link, one or more management frames advertising a basic service set (BSS) associated with an access point (AP);
    associate with the AP over the first wireless communication link based on the one or more management frames;
    perform a beamforming training operation with the AP over a second wireless communication link based on associating with the AP over the first wireless communication link; and
    communicate with the AP over the second wireless communication link using a beam based on the beamforming training operation.

29. The STA of clause 28, further including:
a local oscillator (LO) configured to drive the carrier frequencies associated with each of the first wireless communication link and the second wireless communication link.

30. The STA of any of clauses 28 or 29, further including:
a clock configured to control a timing of communications on each of the first wireless communication link and the second wireless communication link.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. As used herein, "based on" is intended to be interpreted in the inclusive sense, unless otherwise explicitly indicated. For example, "based on" may be used interchangeably with "based at least in part on," unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:
1. A method for wireless communication by a wireless access point (AP), comprising:
    transmitting, on a first wireless communication link operating in a sub-7 GHz frequency band, one or more management frames advertising a basic service set (BSS) associated with the AP;

associating with a wireless station (STA) over the first wireless communication link in accordance with the one or more management frames;

performing a beamforming training operation with the STA over a second wireless communication link operating at a carrier frequency above 7 GHz in accordance with associating with the STA over the first wireless communication link; and communicating with the STA over the second wireless communication link using a beam that is in accordance with the beamforming training operation.

2. The method of claim 1, further comprising:
transmitting, to the STA, a trigger frame over the first wireless communication link that carries beam management setup information, the beam management setup information indicating a start of the beamforming training operation over the second wireless communication link and indicating a frequency of the second wireless communication link.

3. The method of claim 2, wherein the beam management setup information includes frequency information indicating a carrier frequency offset (CFO) associated with wireless communication on the second wireless communication link.

4. The method of claim 2, wherein the beam management setup information includes timing information indicating a timing of wireless communication on the second wireless communication link.

5. The method of claim 1, wherein performing the beamforming training operation comprises:
transmitting, to the STA, a plurality of beamforming training (BFT) packets in a plurality of directions over the second wireless communication link;
receiving, from the STA, feedback associated with one or more of the plurality of BFT packets over the first wireless communication link or the second wireless communication link, wherein each of the BFT packets consists of a single respective physical layer (PHY) training field.

6. The method of claim 5, wherein the feedback is carried in a packet consisting of a single respective PHY training field.

7. The method of claim 5, wherein the feedback is carried in a packet consisting of a single respective PHY training field and a single respective PHY signal field.

8. The method of claim 5, wherein the feedback is received on only the second wireless communication link.

9. The method of claim 5, wherein the feedback is received on only the first wireless communication link.

10. The method of claim 5, further comprising:
receiving, from the STA, a second plurality of BFT packets in a second plurality of directions over the second wireless communication link; and
transmitting, to the STA, feedback associated with one or more of the second plurality of BFT packets over the first wireless communication link or the second wireless communication link.

11. The method of claim 1, further comprising:
transmitting, on the first wireless communication link, scheduling information allocating a service period (SP) for the communication with the STA over the second wireless communication link.

12. The method of claim 1, wherein the first wireless communication link comprises an anchor link, and wherein the second wireless communication link comprises a directional link.

13. A wireless access point (AP) for wireless communication, comprising:

at least one memory; and
at least one processor communicatively coupled with the at least one memory, the at least one processor configured to cause the AP to:
transmit, on a first wireless communication link operating in a sub-7 GHz frequency band, one or more management frames advertising a basic service set (BSS) associated with the AP;
associate with a wireless station (STA) over the first wireless communication link in accordance with the one or more management frames;
performing a beamforming training operation with the STA over a second wireless communication link operating at a carrier frequency above 7 GHz in accordance with associating with the STA over the first wireless communication link; and
communicate with the STA over the second wireless communication link using a beam that is in accordance with the beamforming training operation.

14. The AP of claim 13, further comprising:
a local oscillator (LO) configured to drive carrier frequencies associated with each of the first wireless communication link and the second wireless communication link.

15. The AP of claim 13, further comprising:
a clock configured to control a timing of communication on each of the first wireless communication link and the second wireless communication link.

16. A method for wireless communication by a wireless station (STA), comprising:
receiving, on a first wireless communication link operating in a sub-7 GHz frequency band, one or more management frames advertising a basic service set (BSS) associated with an access point (AP);
associating with the AP over the first wireless communication link in accordance with the one or more management frames;
performing a beamforming training operation with the AP over a second wireless communication link operating at a carrier frequency above 7 GHz in accordance with associating with the STA over the first wireless communication link; and
communicating with the AP over the second wireless communication link using a beam that is in accordance with the beamforming training operation.

17. The method of claim 16, further comprising:
receiving, from the AP, a trigger frame over the first wireless communication link that carries beam management setup information, the beam management setup information indicating a start of the beamforming training operation over the second wireless communication link and indicating a frequency of the second wireless communication link.

18. The method of claim 17, wherein the beam management setup information includes frequency information indicating a carrier frequency offset (CFO) associated with wireless communication on the second wireless communication link.

19. The method of claim 17, wherein the beam management setup information includes timing information indicating a timing of wireless communication on the second wireless communication link.

20. The method of claim 17, wherein performing the beamforming training operation comprises:
receiving, from the AP, a plurality of beamforming training (BFT) packets in a plurality of directions over the second wireless communication link;

transmitting, to the AP, feedback associated with one or more of the plurality of BFT packets over the first wireless communication link or the second wireless communication link, wherein each of the BFT packets consists of a single respective physical layer (PHY) training field.

21. The method of claim 20, wherein the feedback is carried in a packet consisting of a single respective PHY training field.

22. The method of claim 20, wherein the feedback is carried in a packet consisting of a single respective PHY training field and a single respective PHY signal field.

23. The method of claim 20, wherein the feedback is received on only the second wireless communication link.

24. The method of claim 20, wherein the feedback is received on only the first wireless communication link.

25. The method of claim 20, further comprising:
transmitting, to the AP, a second plurality of BFT packets in a second plurality of directions over the second wireless communication link; and
receiving, from the AP, feedback associated with one or more of the second plurality of BFT packets over the first wireless communication link or the second wireless communication link.

26. The method of claim 16, further comprising:
receiving, on the first wireless communication link, scheduling information allocating a service period (SP) for the communication with the AP over the second wireless communication link.

27. The method of claim 16, wherein the first wireless communication link comprises an anchor link, and wherein the second wireless communication link comprises a directional link.

28. A wireless station (STA), comprising:
at least one memory; and
at least one processor communicatively coupled with the at least one memory, the at least one processor configured to cause the STA to:
receive, on a first wireless communication link operating in a sub-7 GHz frequency band, one or more management frames advertising a basic service set (BSS) associated with an access point (AP);
associate with the AP over the first wireless communication link in accordance with the one or more management frames;
performing a beamforming training operation with the STA over a second wireless communication link operating at a carrier frequency above 7 GHz in accordance with associating with the STA over the first wireless communication link; and
communicate with the AP over the second wireless communication link using a beam that is in accordance with the beamforming training operation.

29. The STA of claim 28, further comprising:
a local oscillator (LO) configured to drive carrier frequencies associated with each of the first wireless communication link and the second wireless communication link.

30. The STA of claim 28, further comprising:
a clock configured to control a timing of communication on each of the first wireless communication link and the second wireless communication link.

* * * * *